(12) United States Patent
Prager et al.

(10) Patent No.: US 11,858,633 B2
(45) Date of Patent: *Jan. 2, 2024

(54) METHODS AND SYSTEMS FOR DOOR-ENABLED LOADING AND RELEASE OF PAYLOADS IN AN UNMANNED AERIAL VEHICLE (UAV)

(71) Applicant: Wing Aviation LLC, Mountain View, CA (US)

(72) Inventors: Andre Prager, Sunnyvale, CA (US); Adam Woodworth, San Jose, CA (US)

(73) Assignee: WING AVIATION LLC, Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/508,635

(22) Filed: Oct. 22, 2021

(65) Prior Publication Data
US 2022/0048625 A1 Feb. 17, 2022

Related U.S. Application Data

(63) Continuation of application No. 15/850,705, filed on Dec. 21, 2017, now Pat. No. 11,186,368.

(51) Int. Cl.
*B64D 1/10* (2006.01)
*B64C 39/02* (2023.01)
(Continued)

(52) U.S. Cl.
CPC .............. *B64D 1/10* (2013.01); *B64C 39/024* (2013.01); *G06F 21/31* (2013.01);
(Continued)

(58) Field of Classification Search
CPC .......... B64C 2201/12; B64C 2201/128; B64C 2201/141; B64C 2201/143; B64C 1/0009;
(Continued)

(56) References Cited

U.S. PATENT DOCUMENTS 9,382,003 B2   7/2016 Burema
9,598,172 B2   3/2017 Markov
(Continued)

FOREIGN PATENT DOCUMENTS

CN    106628181 A    5/2017
CN    107004177 A    8/2017
(Continued)

*Primary Examiner* — Timothy D Collins
*Assistant Examiner* — Terri L Filosi
(74) *Attorney, Agent, or Firm* — MCDONNELL BOEHNEN HULBERT & BERGHOFF LLP

(57) ABSTRACT

Example implementations may relate to door-enabled loading and release of payloads in an unmanned aerial vehicle (UAV), which could be a type of UAV in a group of UAVs that is assigned to carry out certain transport tasks. In particular, the UAV may include a fuselage having a first side and a second side, as well as a chamber formed within the fuselage and arranged to house a payload. A first door may be arranged on the first side of the fuselage, such that an opening of the first door enables loading of the payload into the chamber. And a second door may be arranged on the second side of the fuselage, such that an opening of the second door enables release of the payload from the chamber. Moreover, the UAV may include a control system configured to control flight of the UAV, and possibly opening and/or closing of door(s).

20 Claims, 16 Drawing Sheets

(51) Int. Cl.
*G06F 21/31* (2013.01)
*B64U 101/60* (2023.01)

(52) U.S. Cl.
CPC ...... *B64U 2101/60* (2023.01); *B64U 2201/10* (2023.01); *B64U 2201/20* (2023.01)

(58) Field of Classification Search
CPC ....... B64C 1/1415; B64C 39/024; B64D 1/08; B64D 1/10
See application file for complete search history.

(56) References Cited

U.S. PATENT DOCUMENTS

| | | |
|---|---|---|
| 2009/0008499 A1 | 1/2009 | Shaw |
| 2015/0317596 A1 | 11/2015 | Hejazi |
| 2016/0016664 A1 | 1/2016 | Basuni |
| 2016/0033966 A1 | 2/2016 | Farris |
| 2016/0068264 A1 | 3/2016 | Ganesh et al. |
| 2017/0203843 A1 | 7/2017 | Chan |
| 2017/0287244 A1 | 10/2017 | Jansen et al. |
| 2017/0320572 A1 | 11/2017 | High et al. |
| 2018/0137454 A1 | 5/2018 | Kulkarni et al. |
| 2019/0092445 A1 | 3/2019 | Bailey |
| 2019/0112025 A1 | 4/2019 | Sugaki et al. |
| 2019/0144116 A1 | 5/2019 | Yuan |
| 2020/0046156 A1 | 2/2020 | Holzer |

FOREIGN PATENT DOCUMENTS

| | | |
|---|---|---|
| CN | 107444643 A | 12/2017 |
| DE | 202017005797 U1 | 11/2017 |
| KR | 10-2017-0049516 A | 5/2017 |
| WO | 2013/123944 A1 | 8/2013 |
| WO | 2015/076886 A2 | 5/2015 |
| WO | 2016049217 A1 | 3/2016 |
| WO | 2017/183551 A1 | 10/2017 |
| WO | 2017190026 A2 | 11/2017 |

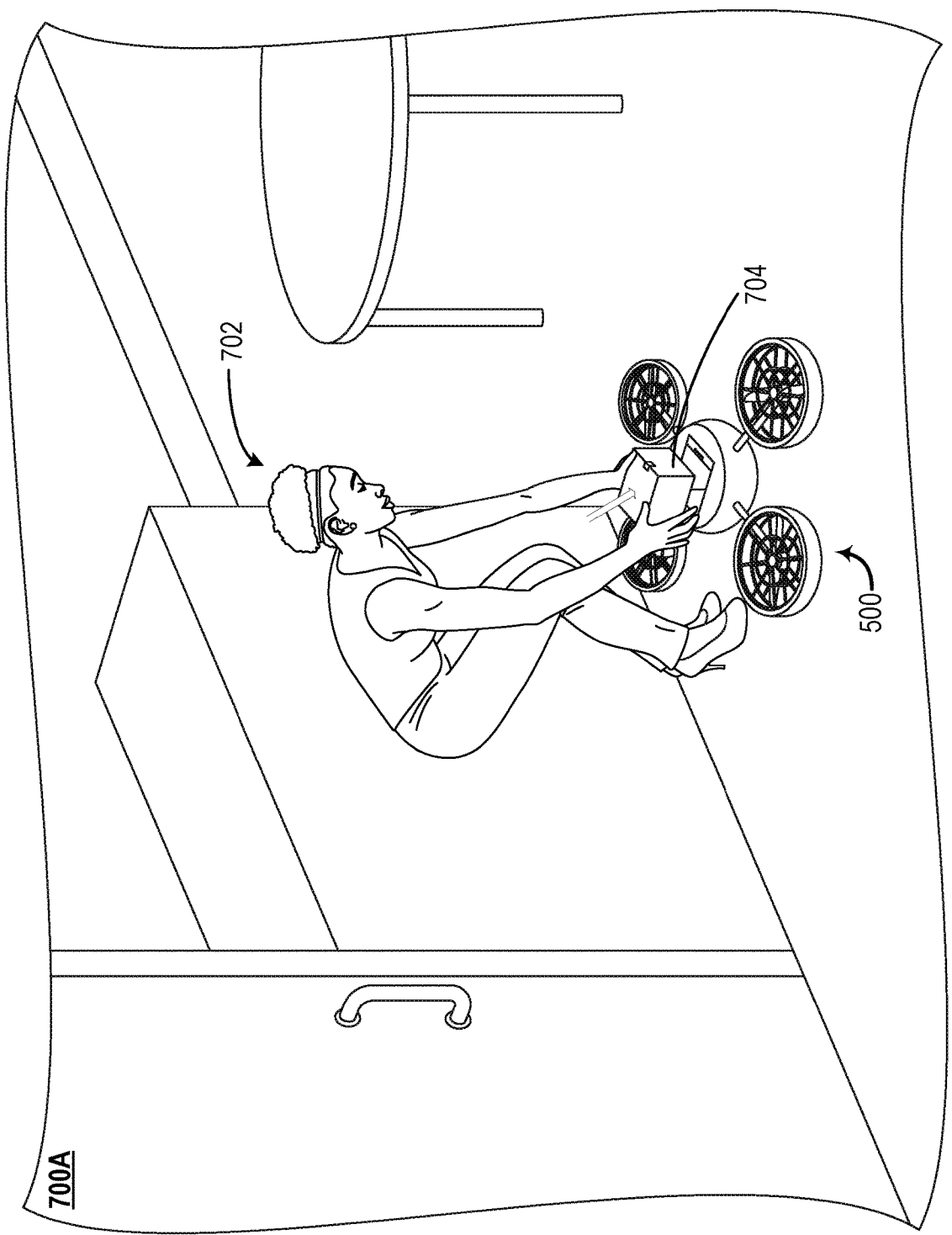

METHODS AND SYSTEMS FOR DOOR-ENABLED LOADING AND RELEASE OF PAYLOADS IN AN UNMANNED AERIAL VEHICLE (UAV)

CROSS REFERENCE TO RELATED APPLICATIONS

The present application is a continuation of U.S. patent application Ser. No. 15/850,705, filed on Dec. 21, 2017 and entitled "Methods and Systems for Door-Enabled Loading and Release of Payloads in an Unmanned Aerial Vehicle (UAV)" which is hereby incorporated by reference in its entirety.

BACKGROUND

An unmanned system, which may also be referred to as an autonomous vehicle, is a vehicle capable of travel without a physically-present human operator. An unmanned system may operate in a remote-control mode, in an autonomous mode, or in a partially autonomous mode.

When an unmanned system operates in a remote-control mode, a pilot or driver that is at a remote location can control the unmanned vehicle via commands that are sent to the unmanned vehicle via a wireless link. When the unmanned system operates in autonomous mode, the unmanned system typically moves based on pre-programmed navigation waypoints, dynamic automation systems, or a combination of these. Further, some unmanned systems can operate in both a remote-control mode and an autonomous mode, and in some instances may do so simultaneously. For instance, a remote pilot or driver may wish to leave navigation to an autonomous system while manually performing another task, such as operating a mechanical system for picking up objects, as an example.

Various types of unmanned systems exist for various different environments. For instance, unmanned aerial vehicles (UAVs) are configured for operation in the air (e.g., flight). Examples include quad-copters and tail-sitter UAVs, among others. Unmanned systems also exist for hybrid operations in which multi-environment operation is possible. Examples of hybrid unmanned vehicles include an amphibious craft that is capable of operation on land as well as on water or a floatplane that is capable of landing on water as well as on land. Other examples are also possible.

SUMMARY

Example implementations may relate to a UAV having doors that enable loading and release of a payload. Such door-enabled loading and release may in turn allow the UAV to carry out pick up and/or delivery payload(s) according to one or more of various possible approaches. Moreover, this UAV could be a lightweight UAV having unexposed propellers, which could make the UAV suitable for pickup and delivery of smaller and/or lightweight payloads, possibly in the vicinity of individuals.

By way of example, the UAV may include a top door on a top side of the UAV's fuselage and a bottom door on a bottom side of the UAV's fuselage, and an opening of each door respectively may provide access to a chamber within the fuselage, which could be arranged to temporarily house a payload. In this example, an opening of the top door may enable loading of a payload into the UAV's chamber, and an opening of the bottom door may enable release of the payload from the UAV's chamber. Generally, such top loading and bottom release of payloads could be advantageous for various reasons.

For instance, assuming that the UAV is arranged to substantially land on the bottom side, the top loading may allow the UAV to land, rather than fly (e.g., hover), during pickup of the payload, thereby reducing the amount of energy being used by the UAV during pickup, among other advantages. Additionally or alternatively, when the UAV is at a delivery location, the UAV may release the payload via the bottom door without necessarily having to wait for an individual to be present in order to unload the payload via the top door, thereby reducing the amount of time the UAV spends on delivery of the payload. Other examples are also possible.

In one aspect, a UAV is disclosed. The UAV includes a control system configured to control flight of the UAV. The UAV also includes a fuselage having a first side, a second side, and a chamber arranged to house a payload. The UAV further includes a first door arranged on the first side of the fuselage, where an opening of the first door enables loading of the payload into the chamber. The UAV yet further includes a second door arranged on the second side of the fuselage, where an opening of the second door enables release of the payload from the chamber.

In another aspect, a method is disclosed. The method involves determining, by a control system, that a UAV is at a pickup location for pickup of a payload, where the UAV includes a fuselage having a first side, a second side, and a chamber arranged to house the payload, where a first door is arranged on the first side of the fuselage, where an opening of the first door enables loading of the payload into the chamber, where a second door is arranged on the second side of the fuselage, and where an opening of the second door enables release of the payload from the chamber. The method also involves, in response to determining that the UAV is at the pickup location for pickup of the payload, causing, by the control system, the opening of the first door to enable loading of the payload into the chamber. The method additionally involves determining, by the control system, that the UAV is at a delivery location for delivery of the payload. The method further involves, in response to determining that the UAV is at a delivery location for delivery of the payload, causing, by the control system, the opening of the second door to enable release of the payload from the chamber.

In yet another aspect, another method is disclosed. The method involves receiving, by a control system, a request for a transport task to be performed by at least one UAV from a group of UAVs, where the group of UAVs includes at least a first UAV of a first type and a second UAV of a second type, where the first type of UAV includes a fuselage having a first side, a second side, and a chamber arranged to house a payload, where a first door is arranged on the first side of the fuselage, where an opening of the first door enables loading of the payload into the chamber, where a second door is arranged on the second side of the fuselage, and where an opening of the second door enables release of the payload from the chamber. The method also involves, based on the first UAV being of the first type, determining, by the control system, that the first UAV meets a criteria for the transport task. The method additionally involves, in response to determining that the first UAV meets the criteria for the transport task, causing, by the control system, the first UAV to perform the transport task corresponding to the received request.

In yet another aspect, yet another method is disclosed. The method involves determining, by a control system, that a UAV is at a pickup location for pickup of a payload, where the UAV comprises a fuselage having a door and a chamber arranged to house the payload. The method also involves, in response to determining that the UAV is at the pickup location for pickup of the payload, causing, by the control system, an opening of the door to enable loading of the payload into the chamber. The method additionally involves determining, by the control system, that the UAV is at a delivery location for delivery of the payload. The method further involves, in response to determining that the UAV is at a delivery location for delivery of the payload, causing, by the control system, an opening of the door to enable release of the payload from the chamber.

In yet another aspect, a system is disclosed. The system may include means for determining that a UAV is at a pickup location for pickup of a payload, where the UAV includes a fuselage having a first side, a second side, and a chamber arranged to house the payload, where a first door is arranged on the first side of the fuselage, where an opening of the first door enables loading of the payload into the chamber, where a second door is arranged on the second side of the fuselage, and where an opening of the second door enables release of the payload from the chamber. The system may also include means for, in response to determining that the UAV is at the pickup location for pickup of the payload, causing the opening of the first door to enable loading of the payload into the chamber. The system may additionally include means for determining that the UAV is at a delivery location for delivery of the payload. The system may further include means for, in response to determining that the UAV is at a delivery location for delivery of the payload, causing the opening of the second door to enable release of the payload from the chamber.

In yet another aspect, another system is disclosed. The system may include means for receiving a request for a transport task to be performed by at least one UAV from a group of UAVs, where the group of UAVs includes at least a first UAV of a first type and a second UAV of a second type, where the first type of UAV includes a fuselage having a first side, a second side, and a chamber arranged to house a payload, where a first door is arranged on the first side of the fuselage, where an opening of the first door enables loading of the payload into the chamber, where a second door is arranged on the second side of the fuselage, and where an opening of the second door enables release of the payload from the chamber. The system may also include means for, based on the first UAV being of the first type, determining that the first UAV meets a criteria for the transport task. The system may additionally include means for, in response to determining that the first UAV meets the criteria for the transport task, causing the first UAV to perform the transport task corresponding to the received request.

In yet another aspect, yet another system is disclosed. The system may include means for determining that a UAV is at a pickup location for pickup of a payload, where the UAV comprises a fuselage having a door and a chamber arranged to house the payload. The system may also include means for, in response to determining that the UAV is at the pickup location for pickup of the payload, causing an opening of the door to enable loading of the payload into the chamber. The system may additionally include means for determining that the UAV is at a delivery location for delivery of the payload. The system may further include means for, in response to determining that the UAV is at a delivery location for delivery of the payload, causing, by the control system, an opening of the door to enable release of the payload from the chamber.

These as well as other aspects, advantages, and alternatives, will become apparent to those of ordinary skill in the art by reading the following detailed description, with reference where appropriate to the accompanying drawings. Further, it should be understood that the description provided in this summary section and elsewhere in this document is intended to illustrate the claimed subject matter by way of example and not by way of limitation.

BRIEF DESCRIPTION OF THE DRAWINGS

FIG. 7A illustrates door-enabled loading of a payload into an unmanned aerial vehicle, according to example implementations.

DETAILED DESCRIPTION

Figure 1A:
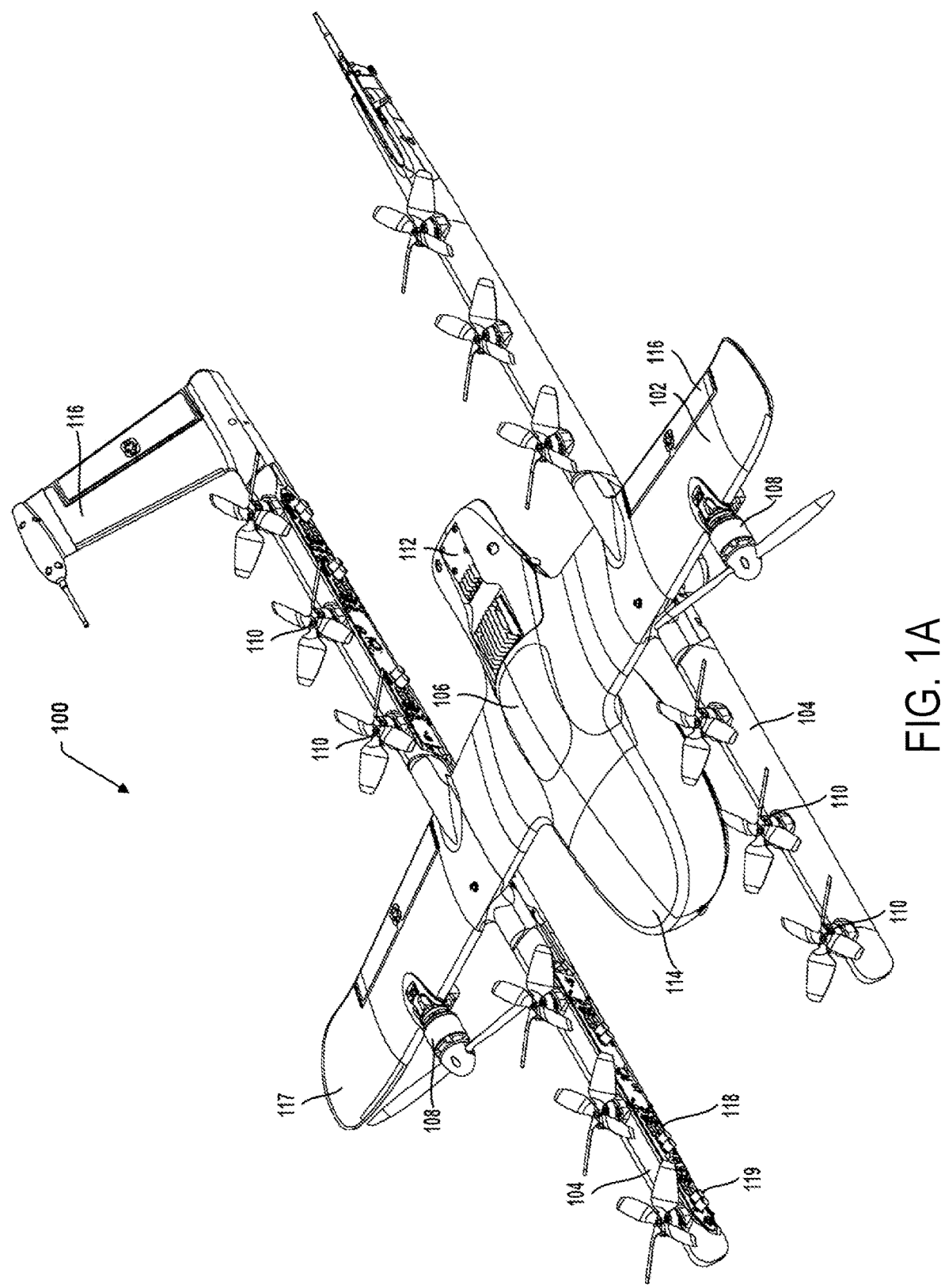
FIG. 1A is a simplified illustration of an unmanned aerial vehicle, according to example implementations.

Example methods and systems are described herein. It should be understood that the words "example" and "example" are used herein to mean "serving as an example, instance, or illustration." Any embodiment or feature described herein as being an "example" or "example" is not necessarily to be construed as preferred or advantageous over other embodiments or features. The example embodiments described herein are not meant to be limiting. It will be readily understood that certain aspects of the disclosed systems and methods can be arranged and combined in a wide variety of different configurations, all of which are contemplated herein.

Furthermore, the particular arrangements shown in the Figures should not be viewed as limiting. It should be understood that other embodiments might include more or less of each element shown in a given Figure. Further, some of the illustrated elements may be combined or omitted. Yet further, an example embodiment may include elements that are not illustrated in the Figures.

I. OVERVIEW

In practice, an unmanned aerial vehicle (UAV) may refer to any autonomous or semi-autonomous aerial vehicle that is capable of performing some operations without a physically present human pilot. Examples of such operations may include pickup of a payload at a pickup location and/or subsequent delivery of the payload to a delivery location.

As UAVs become more prevalent, improvements to pickup and/or delivery of a payload by a UAV may be beneficial. For instance, an individual may be in the vicinity of a UAV for the purpose of loading a payload into the UAV or unloading a payload from the UAV. And in many cases, the payload at issue may be a small payload (e.g., medicine or food). Thus, it is beneficial to arrange a UAV so that the UAV provides for safe and intuitive pickup and/or delivery of a payload in such situation(s).

Accordingly, disclosed herein are UAV and configurations thereof, which provide for door-enabled loading and release of a payload. More specifically, a UAV may have a first door arranged on a first side of the UAV's fuselage and a second door arranged on a second side of the UAV's fuselage. For example, the second side may be a bottom side that is substantially oriented towards the ground during flight of the UAV, and the first side may be a top side that is substantially opposite the bottom side, thereby resulting in top and bottom doors for the UAV. Nonetheless, the doors may each respectively provide access to a chamber that is formed within the fuselage and that is arranged to temporarily house a payload. As such, an opening of the first door (e.g., top door) may enable loading of the payload into the chamber, and an opening of the second door (e.g., bottom door) may enable release of the payload from the chamber.

Moreover, the disclosed UAV may have various features that could provide for safe loading of a payload into the chamber (e.g., by an individual) and/or for release of a payload from the chamber. In particular, the disclosed UAV may be a lightweight UAV having a weight that is below a threshold weight. For example, the disclosed UAV may have a weight that meets regulations for lightweight UAVs. Additionally or alternatively, the UAV may have a propulsion unit including propeller(s) that are unexposed and are thus prevented from making contact with an individual. For example, the disclosed UAV may have a shrouded propeller design. Other examples are possible as well.

Given a UAV arranged as described herein, the opening and closing of the first and/or second doors may be carried out manually by an individual and/or may be automatic. And in the case of automatic control of the doors, the UAV could control the opening and/or closing of one or both of the first and second doors, and do so based on various factors.

By way of example, the control system of the UAV may determine that the UAV is at a pickup location for pickup of a payload, and may responsively cause the opening of a top door so as to enable loading of the payload into the chamber. Once the item has been loaded (e.g., as determined by the control system based on sensor data), the control system may cause the closing of the top door and the UAV may then proceed to navigate to a delivery location. Then, the control system may determine that the UAV is at the delivery location for delivery of the payload, and may responsively cause the opening of a bottom door to enable release of the payload from the chamber. Generally, when a UAV has a bottom door, the release of the payload could be carried out in one of various ways, such as through a drop of the payload from the chamber (e.g., while the UAV is hovering substantially proximate to the ground) or through a tethered delivery of the payload, among others. Other examples are also possible.

Accordingly, such a multiple door arrangement may allow a UAV to carry out pick up and/or delivery payload(s) according to one or more of various possible approaches.

In line with the example above, one possible approach may involve the UAV carrying out top loading and bottom release of a payload, which could be useful for various reasons. For instance, assuming that the UAV is arranged to substantially land on the bottom side, the top loading may allow the UAV to land, rather than fly (e.g., hover), during pickup of the payload, thereby reducing the amount of energy being used by the UAV during pickup, among other advantages. Moreover, this approach may allow the UAV to release the payload via the bottom door without necessarily having to wait for an individual to be present to carry out the unloading of the payload (e.g., via the top door), thereby reducing the amount of time the UAV spends on delivery of the payload.

On the other hand, another possible approach may involve the UAV carrying out bottom loading and top release of a payload, which could also be useful for various reasons. For instance, the UAV may hover when at a pickup location for pickup of a payload, which may allow an individual to load the payload onto the UAV via the bottom door. In practice, such a bottom loading approach may be advantageous in a situation where there is no feasible location at which the UAV can land, among other possibilities. Furthermore, in this approach, the top release/unloading may be carried out by an individual, which may be advantageous when the payload at issue is a high-value item that ideally should not be left unattended after delivery. Other examples are possible as well.

II. ILLUSTRATIVE UNMANNED VEHICLES

Herein, the terms "unmanned aerial system" and "UAV" refer to any autonomous or semi-autonomous vehicle that is capable of performing some functions without a physically present human pilot.

A UAV can take various forms. For example, a UAV may take the form of a fixed-wing aircraft, a glider aircraft, a tail-sitter aircraft, a jet aircraft, a ducted fan aircraft, a lighter-than-air dirigible such as a blimp or steerable balloon, a rotorcraft such as a helicopter or multicopter, and/or an ornithopter, among other possibilities. Further, the terms "drone," "unmanned aerial vehicle system" (UAVS), or "unmanned aerial vehicle" (UAV) may also be used to refer to a UAV.

FIG. 1A is an isometric view of an example UAV 100. UAV 100 includes wing 102, booms 104, and a fuselage 106. Wings 102 may be stationary and may generate lift based on the wing shape and the UAV's forward airspeed. For instance, the two wings 102 may have an airfoil-shaped cross section to produce an aerodynamic force on UAV 100. In some embodiments, wing 102 may carry horizontal propulsion units 108, and booms 104 may carry vertical propulsion units 110. In operation, power for the propulsion units may be provided from a battery compartment 112 of fuselage 106. In some embodiments, fuselage 106 also includes an avionics compartment 114, an additional battery compartment (not shown) and/or a delivery unit (not shown, e.g., a winch system) for handling the payload. In some embodiments, fuselage 106 is modular, and two or more compartments (e.g., battery compartment 112, avionics compartment 114, other payload and delivery compartments) are detachable from each other and securable to each other (e.g., mechanically, magnetically, or otherwise) to contiguously form at least a portion of fuselage 106.

In some embodiments, booms 104 terminate in rudders 116 for improved yaw control of UAV 100. Further, wings 102 may terminate in wing tips 117 for improved control of lift of the UAV.

In the illustrated configuration, UAV 100 includes a structural frame. The structural frame may be referred to as a "structural H-frame" or an "H-frame" (not shown) of the UAV. The H-frame may include, within wings 102, a wing spar (not shown) and, within booms 104, boom carriers (not shown). In some embodiments the wing spar and the boom carriers may be made of carbon fiber, hard plastic, aluminum, light metal alloys, or other materials. The wing spar and the boom carriers may be connected with clamps. The wing spar may include pre-drilled holes for horizontal propulsion units 108, and the boom carriers may include pre-drilled holes for vertical propulsion units 110.

In some embodiments, fuselage 106 may be removably attached to the H-frame (e.g., attached to the wing spar by clamps, configured with grooves, protrusions or other features to mate with corresponding H-frame features, etc.). In other embodiments, fuselage 106 similarly may be removably attached to wings 102. The removable attachment of fuselage 106 may improve quality and or modularity of UAV 100. For example, electrical/mechanical components and/or subsystems of fuselage 106 may be tested separately from, and before being attached to, the H-frame. Similarly, printed circuit boards (PCBs) 118 may be tested separately from, and before being attached to, the boom carriers, therefore eliminating defective parts/subassemblies prior to completing the UAV. For example, components of fuselage 106 (e.g., avionics, battery unit, delivery units, an additional battery compartment, etc.) may be electrically tested before fuselage 106 is mounted to the H-frame. Furthermore, the motors and the electronics of PCBs 118 may also be electrically tested before the final assembly. Generally, the identification of the defective parts and subassemblies early in the assembly process lowers the overall cost and lead time of the UAV. Furthermore, different types/models of fuselage 106 may be attached to the H-frame, therefore improving the modularity of the design. Such modularity allows these various parts of UAV 100 to be upgraded without a substantial overhaul to the manufacturing process.

In some embodiments, a wing shell and boom shells may be attached to the H-frame by adhesive elements (e.g., adhesive tape, double-sided adhesive tape, glue, etc.). Therefore, multiple shells may be attached to the H-frame instead of having a monolithic body sprayed onto the H-frame. In some embodiments, the presence of the multiple shells reduces the stresses induced by the coefficient of thermal expansion of the structural frame of the UAV. As a result, the UAV may have better dimensional accuracy and/or improved reliability.

Moreover, in at least some embodiments, the same H-frame may be used with the wing shell and/or boom shells having different size and/or design, therefore improving the modularity and versatility of the UAV designs. The wing shell and/or the boom shells may be made of relatively light polymers (e.g., closed cell foam) covered by the harder, but relatively thin, plastic skins.

The power and/or control signals from fuselage 106 may be routed to PCBs 118 through cables running through fuselage 106, wings 102, and booms 104. In the illustrated embodiment, UAV 100 has four PCBs, but other numbers of PCBs are also possible. For example, UAV 100 may include two PCBs, one per the boom. The PCBs carry electronic components 119 including, for example, power converters, controllers, memory, passive components, etc. In operation, propulsion units 108 and 110 of UAV 100 are electrically connected to the PCBs.

Many variations on the illustrated UAV are possible. For instance, fixed-wing UAVs may include more or fewer rotor units (vertical or horizontal), and/or may utilize a ducted fan or multiple ducted fans for propulsion. Further, UAVs with more wings (e.g., an "x-wing" configuration with four wings), are also possible. Although FIG. 1A illustrates two wings 102, two booms 104, two horizontal propulsion units 108, and six vertical propulsion units 110 per boom 104, it should be appreciated that other variants of UAV 100 may be implemented with more or less of these components. For example, UAV 100 may include four wings 102, four booms 104, and more or less propulsion units (horizontal or vertical).

Figure 1B:
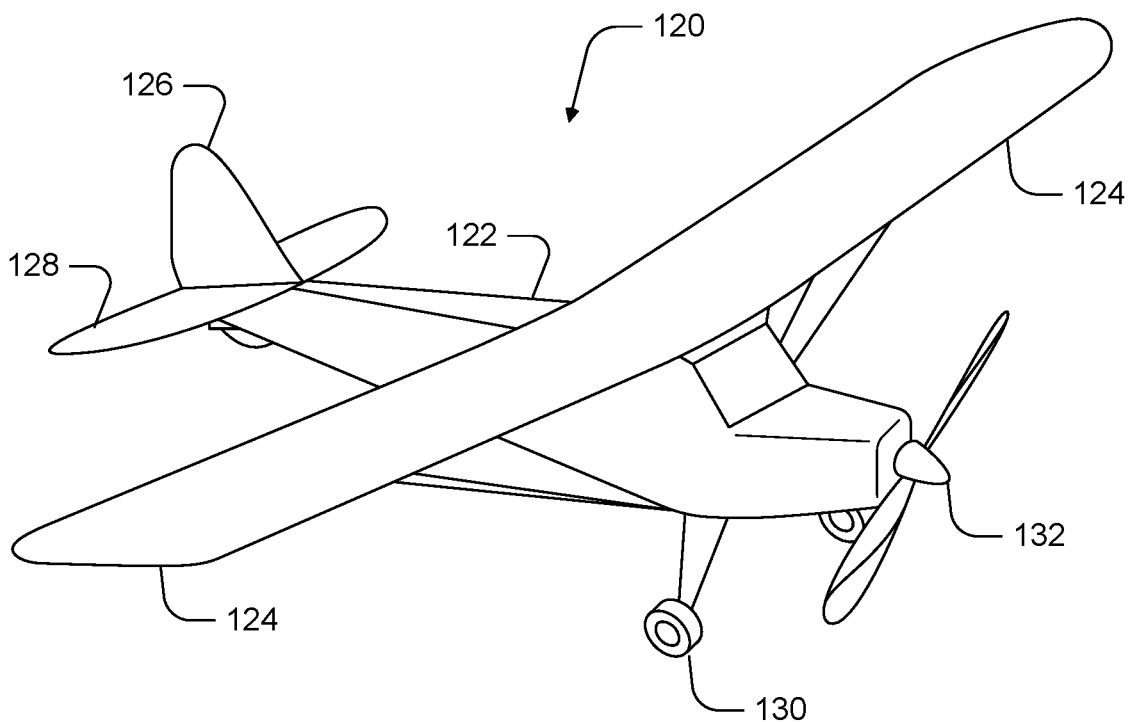
FIG. 1B is a simplified illustration of an unmanned aerial vehicle, according to example implementations.

Similarly, FIG. 1B shows another example of a fixed-wing UAV 120. The fixed-wing UAV 120 includes a fuselage 122, two wings 124 with an airfoil-shaped cross section to provide lift for the UAV 120, a vertical stabilizer 126 (or fin) to stabilize the plane's yaw (turn left or right), a horizontal stabilizer 128 (also referred to as an elevator or tailplane) to stabilize pitch (tilt up or down), landing gear 130, and a propulsion unit 132, which can include a motor, shaft, and propeller.

Figure 1C:
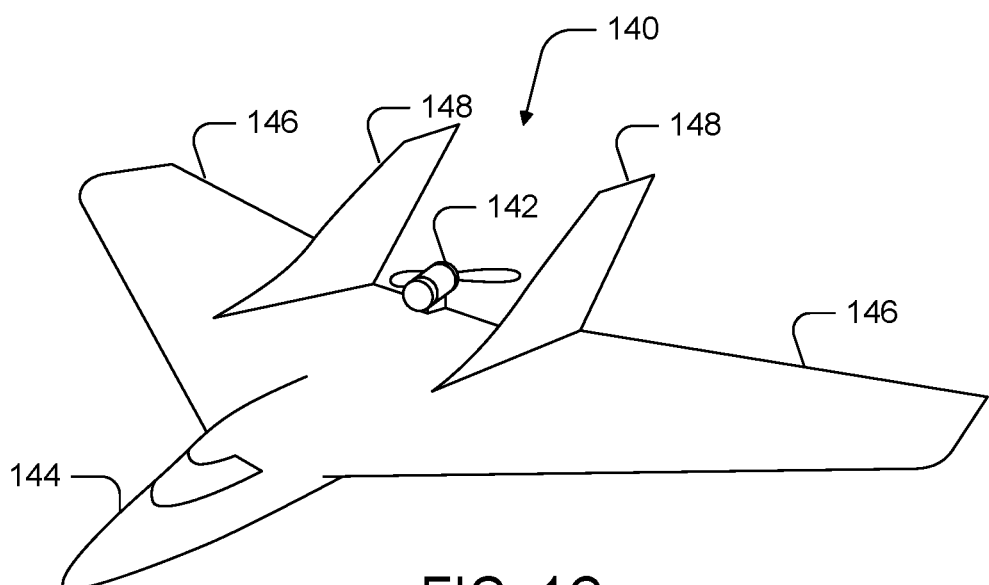
FIG. 1C is a simplified illustration of an unmanned aerial vehicle, according to example implementations.

FIG. 1C shows an example of a UAV 140 with a propeller in a pusher configuration. The term "pusher" refers to the fact that a propulsion unit 142 is mounted at the back of the UAV and "pushes" the vehicle forward, in contrast to the propulsion unit being mounted at the front of the UAV. Similar to the description provided for FIGS. 1A and 1B, FIG. 1C depicts common structures used in a pusher plane, including a fuselage 144, two wings 146, vertical stabilizers 148, and the propulsion unit 142, which can include a motor, shaft, and propeller.

Figure 1D:
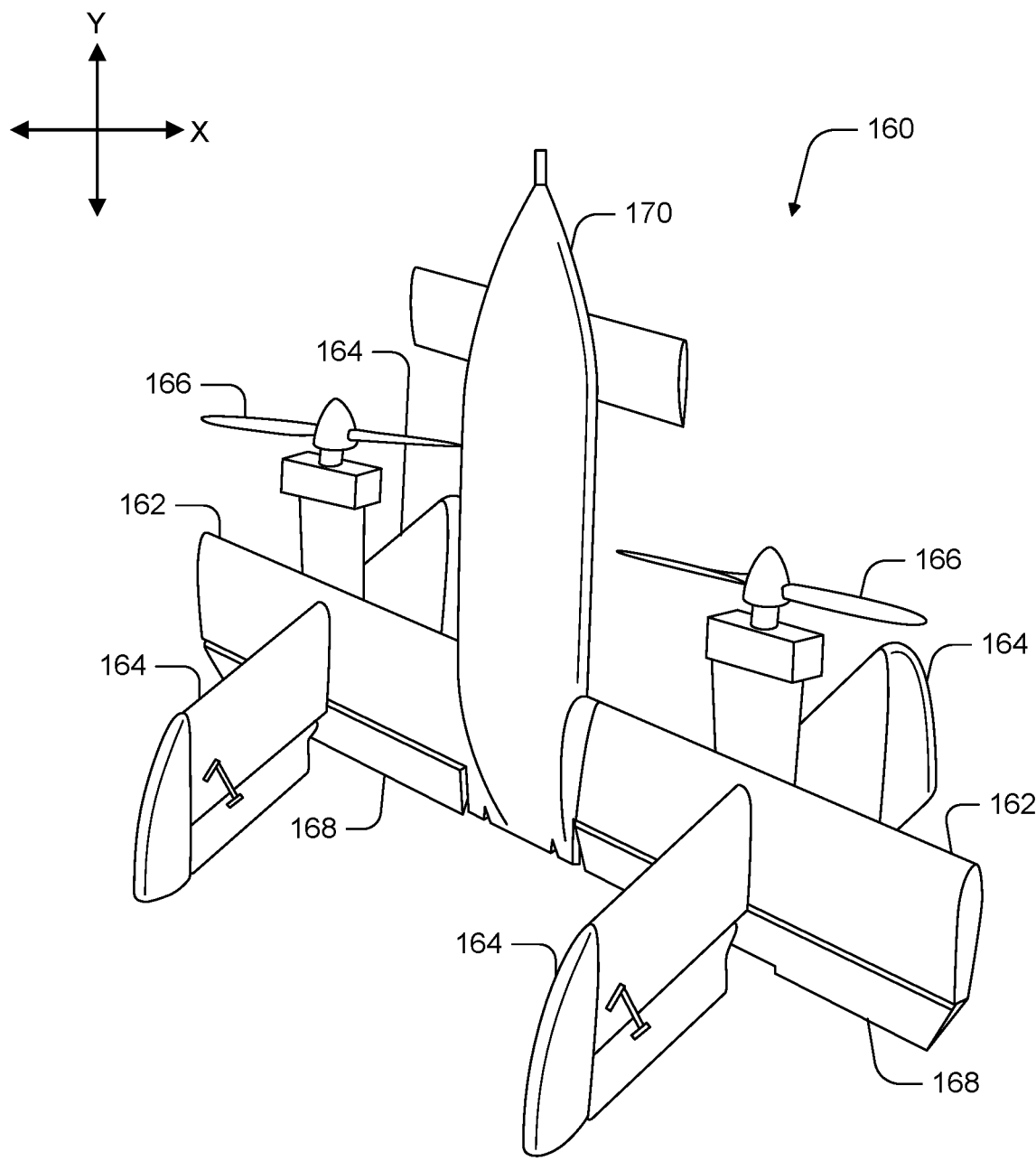
FIG. 1D is a simplified illustration of an unmanned aerial vehicle, according to example implementations.

FIG. 1D shows an example of a tail-sitter UAV 160. In the illustrated example, the tail-sitter UAV 160 has fixed wings 162 to provide lift and allow the UAV 160 to glide horizontally (e.g., along the x-axis, in a position that is approximately perpendicular to the position shown in FIG. 1D). However, the fixed wings 162 also allow the tail-sitter UAV 160 to take off and land vertically on its own.

For example, at a launch site, the tail-sitter UAV 160 may be positioned vertically (as shown) with its fins 164 and/or wings 162 resting on the ground and stabilizing the UAV 160 in the vertical position. The tail-sitter UAV 160 may then take off by operating its propellers 166 to generate an upward thrust (e.g., a thrust that is generally along the y-axis). Once at a suitable altitude, the tail-sitter UAV 160 may use its flaps 168 to reorient itself in a horizontal position, such that its fuselage 170 is closer to being aligned with the x-axis than the y-axis. Positioned horizontally, the propellers 166 may provide forward thrust so that the tail-sitter UAV 160 can fly in a similar manner as a typical airplane.

Many variations on the illustrated fixed-wing UAVs are possible. For instance, fixed-wing UAVs may include more or fewer propellers, and/or may utilize a ducted fan or multiple ducted fans for propulsion. Further, UAVs with more wings (e.g., an "x-wing" configuration with four wings), with fewer wings, or even with no wings, are also possible.

Figure 1E:
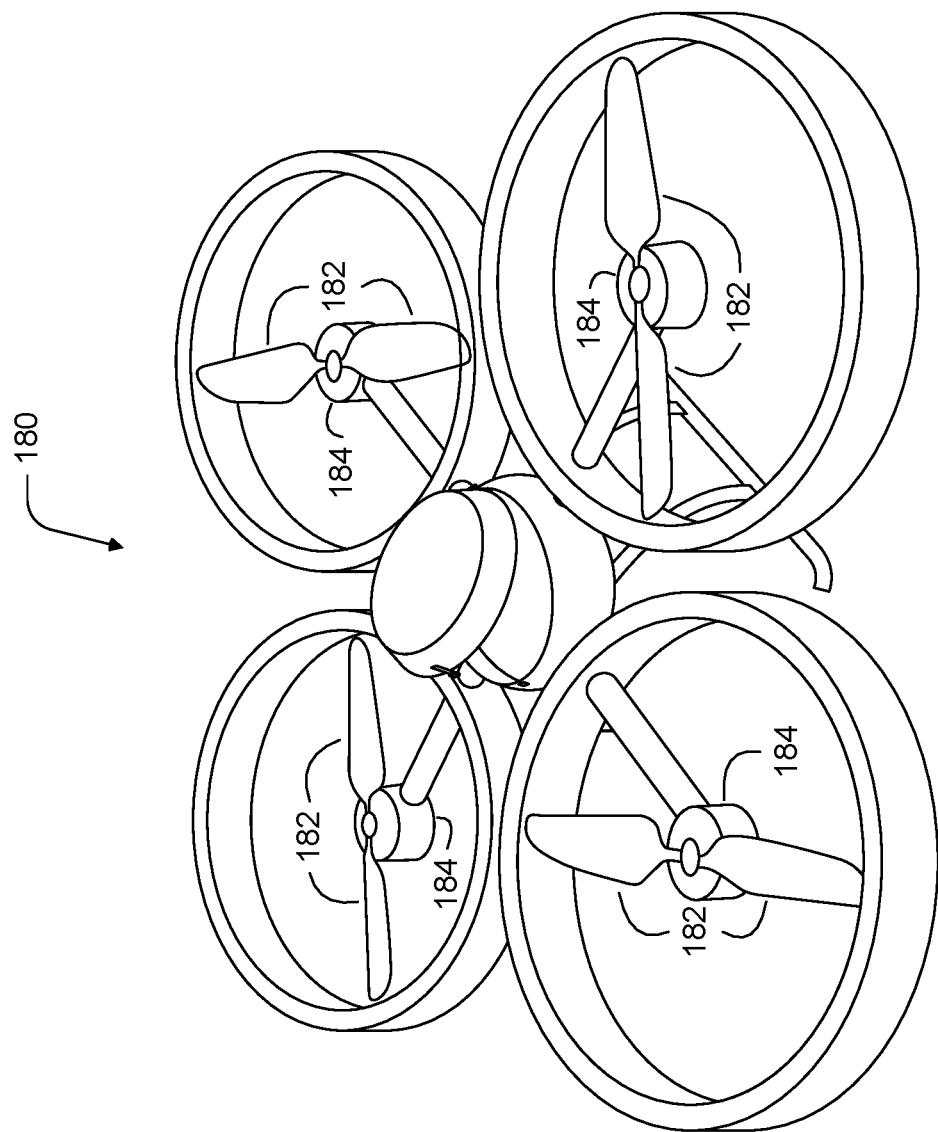
FIG. 1E is a simplified illustration of an unmanned aerial vehicle, according to example implementations.

As noted above, some embodiments may involve other types of UAVs, in addition to or in the alternative to fixed-wing UAVs. For instance, FIG. 1E shows an example of a rotorcraft that is commonly referred to as a multicopter 180. The multicopter 180 may also be referred to as a quadcopter, as it includes four rotors 182. It should be understood that example embodiments may involve a rotorcraft with more or fewer rotors than the multicopter 180. For example, a helicopter typically has two rotors. Other examples with three or more rotors are possible as well. Herein, the term "multicopter" refers to any rotorcraft having more than two rotors, and the term "helicopter" refers to rotorcraft having two rotors.

Referring to the multicopter 180 in greater detail, the four rotors 182 provide propulsion and maneuverability for the multicopter 180. More specifically, each rotor 182 includes blades that are attached to a motor 184. Configured as such, the rotors 182 may allow the multicopter 180 to take off and land vertically, to maneuver in any direction, and/or to hover. Further, the pitch of the blades may be adjusted as a group and/or differentially, and may allow the multicopter 180 to control its pitch, roll, yaw, and/or altitude.

It should be understood that references herein to an "unmanned" aerial vehicle or UAV can apply equally to autonomous and semi-autonomous aerial vehicles. In an autonomous implementation, all functionality of the aerial vehicle is automated; e.g., pre-programmed or controlled via real-time computer functionality that responds to input from various sensors and/or pre-determined information. In a semi-autonomous implementation, some functions of an aerial vehicle may be controlled by a human operator, while other functions are carried out autonomously. Further, in some embodiments, a UAV may be configured to allow a remote operator to take over functions that can otherwise be controlled autonomously by the UAV. Yet further, a given type of function may be controlled remotely at one level of abstraction and performed autonomously at another level of abstraction. For example, a remote operator could control high level navigation decisions for a UAV, such as by specifying that the UAV should travel from one location to another (e.g., from a warehouse in a suburban area to a delivery address in a nearby city), while the UAV's navigation system autonomously controls more fine-grained navigation decisions, such as the specific route to take between the two locations, specific flight controls to achieve the route and avoid obstacles while navigating the route, and so on.

More generally, it should be understood that the example UAVs described herein are not intended to be limiting. Example embodiments may relate to, be implemented within, or take the form of any type of unmanned aerial vehicle.

III. ILLUSTRATIVE UAV COMPONENTS

Figure 2:
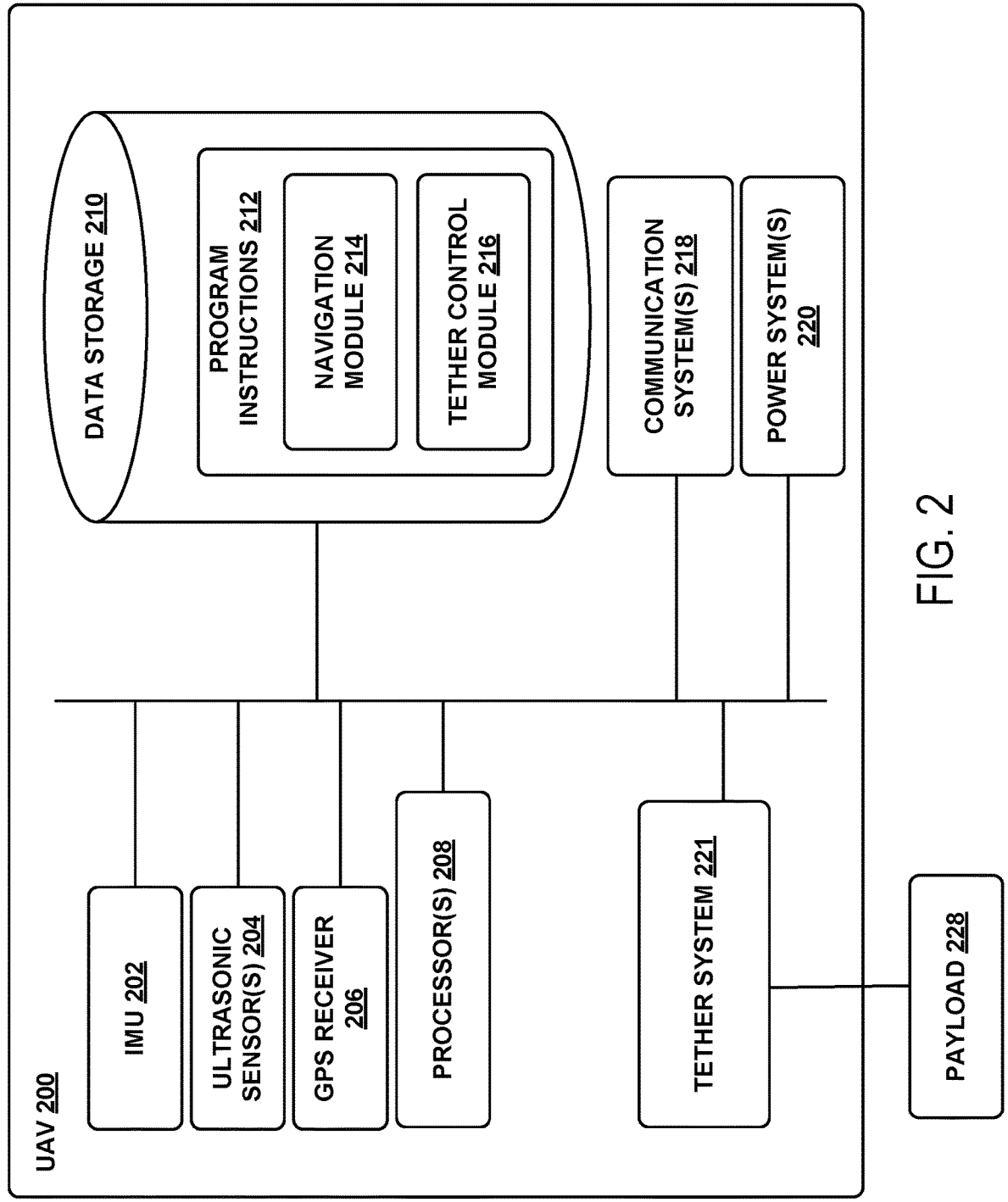
FIG. 2 is a simplified block diagram illustrating components of an unmanned aerial system, according to example implementations.

FIG. 2 is a simplified block diagram illustrating components of a UAV 200, according to an example embodiment. UAV 200 may take the form of, or be similar in form to, one of the UAVs 100, 120, 140, 160, and 180 described in reference to FIGS. 1A-1E. However, UAV 200 may also take other forms.

UAV 200 may include various types of sensors, and may include a computing system configured to provide the functionality described herein. In the illustrated embodiment, the sensors of UAV 200 include an inertial measurement unit (IMU) 202, ultrasonic sensor(s) 204, and a GPS 206, among other possible sensors and sensing systems.

In the illustrated embodiment, UAV 200 also includes one or more processors 208. A processor 208 may be a general-purpose processor or a special purpose processor (e.g., digital signal processors, application specific integrated circuits, etc.). The one or more processors 208 can be configured to execute computer-readable program instructions 212 that are stored in the data storage 210 and are executable to provide the functionality of a UAV described herein.

The data storage 210 may include or take the form of one or more computer-readable storage media that can be read or accessed by at least one processor 208. The one or more computer-readable storage media can include volatile and/or non-volatile storage components, such as optical, magnetic, organic or other memory or disc storage, which can be integrated in whole or in part with at least one of the one or more processors 208. In some embodiments, the data storage 210 can be implemented using a single physical device (e.g., one optical, magnetic, organic or other memory or disc storage unit), while in other embodiments, the data storage 210 can be implemented using two or more physical devices.

As noted, the data storage 210 can include computer-readable program instructions 212 and perhaps additional data, such as diagnostic data of the UAV 200. As such, the data storage 210 may include program instructions 212 to perform or facilitate some or all of the UAV functionality described herein. For instance, in the illustrated embodiment, program instructions 212 include a navigation module 214 and a tether control module 216.

A. Sensors

In an illustrative embodiment, IMU 202 may include both an accelerometer and a gyroscope, which may be used together to determine an orientation of the UAV 200. In particular, the accelerometer can measure the orientation of the vehicle with respect to earth, while the gyroscope measures the rate of rotation around an axis. IMUs are commercially available in low-cost, low-power packages. For instance, an IMU 202 may take the form of or include a miniaturized MicroElectroMechanical System (MEMS) or a NanoElectroMechanical System (NEMS). Other types of IMUs may also be utilized.

An IMU 202 may include other sensors, in addition to accelerometers and gyroscopes, which may help to better determine position and/or help to increase autonomy of the UAV 200. Two examples of such sensors are magnetometers and pressure sensors. In some embodiments, a UAV may include a low-power, digital 3-axis magnetometer, which can be used to realize an orientation independent electronic compass for accurate heading information. However, other types of magnetometers may be utilized as well. Other examples are also possible. Further, note that a UAV could include some or all of the above-described inertia sensors as separate components from an IMU.

UAV 200 may also include a pressure sensor or barometer, which can be used to determine the altitude of the UAV 200. Alternatively, other sensors, such as sonic altimeters or radar altimeters, can be used to provide an indication of altitude, which may help to improve the accuracy of and/or prevent drift of an IMU.

In a further aspect, UAV 200 may include one or more sensors that allow the UAV to sense objects in the environment. For instance, in the illustrated embodiment, UAV 200 includes ultrasonic sensor(s) 204. Ultrasonic sensor(s) 204 can determine the distance to an object by generating sound waves and determining the time interval between transmission of the wave and receiving the corresponding echo off an object. A typical application of an ultrasonic sensor for unmanned vehicles or IMUs is low-level altitude control and obstacle avoidance. An ultrasonic sensor can also be used for vehicles that need to hover at a certain height or need to be capable of detecting obstacles. Other systems can be used to determine, sense the presence of, and/or determine the distance to nearby objects, such as a light detection and ranging (LIDAR) system, laser detection and ranging (LADAR) system, and/or an infrared or forward-looking infrared (FLIR) system, among other possibilities.

In some embodiments, UAV 200 may also include one or more imaging system(s). For example, one or more still and/or video cameras may be utilized by UAV 200 to capture image data from the UAV's environment. As a specific example, charge-coupled device (CCD) cameras or complementary metal-oxide-semiconductor (CMOS) cameras can be used with unmanned vehicles. Such imaging sensor(s) have numerous possible applications, such as obstacle avoidance, localization techniques, ground tracking for more accurate navigation (e.g., by applying optical flow techniques to images), video feedback, and/or image recognition and processing, among other possibilities.

UAV 200 may also include a GPS receiver 206. The GPS receiver 206 may be configured to provide data that is typical of well-known GPS systems, such as the GPS coordinates of the UAV 200. Such GPS data may be utilized by the UAV 200 for various functions. As such, the UAV may use its GPS receiver 206 to help navigate to the caller's location, as indicated, at least in part, by the GPS coordinates provided by their mobile device. Other examples are also possible.

B. Navigation and Location Determination

The navigation module 214 may provide functionality that allows the UAV 200 to, e.g., move about its environment and reach a desired location. To do so, the navigation module 214 may control the altitude and/or direction of flight by controlling the mechanical features of the UAV that affect flight (e.g., its rudder(s), elevator(s), aileron(s), and/or the speed of its propeller(s)).

In order to navigate the UAV 200 to a target location (e.g., a delivery location), the navigation module 214 may implement various navigation techniques, such as map-based navigation and localization-based navigation, for instance. With map-based navigation, the UAV 200 may be provided with a map of its environment, which may then be used to navigate to a particular location on the map. With localization-based navigation, the UAV 200 may be capable of navigating in an unknown environment using localization. Localization-based navigation may involve the UAV 200 building its own map of its environment and calculating its position within the map and/or the position of objects in the environment. For example, as a UAV 200 moves throughout its environment, the UAV 200 may continuously use localization to update its map of the environment. This continuous mapping process may be referred to as simultaneous localization and mapping (SLAM). Other navigation techniques may also be utilized.

In some embodiments, the navigation module 214 may navigate using a technique that relies on waypoints. In particular, waypoints are sets of coordinates that identify points in physical space. For instance, an air-navigation waypoint may be defined by a certain latitude, longitude, and altitude. Accordingly, navigation module 214 may cause UAV 200 to move from waypoint to waypoint, in order to ultimately travel to a final destination (e.g., a final waypoint in a sequence of waypoints).

In a further aspect, the navigation module 214 and/or other components and systems of the UAV 200 may be configured for "localization" to more precisely navigate to the scene of a target location. More specifically, it may be desirable in certain situations for a UAV to be within a threshold distance of the target location where a payload 228 is being delivered by a UAV (e.g., within a few feet of the target destination). To this end, a UAV may use a two-tiered approach in which it uses a more-general location-determination technique to navigate to a general area that is associated with the target location, and then use a more-refined location-determination technique to identify and/or navigate to the target location within the general area.

For example, the UAV 200 may navigate to the general area of a target destination where a payload 228 is being delivered using waypoints and/or map-based navigation. The UAV may then switch to a mode in which it utilizes a localization process to locate and travel to a more specific location. For instance, if the UAV 200 is to deliver a payload to a user's home, the UAV 200 may need to be substantially close to the target location in order to avoid delivery of the payload to undesired areas (e.g., onto a roof, into a pool, onto a neighbor's property, etc.). However, a GPS signal may only get the UAV 200 so far (e.g., within a block of the user's home). A more precise location-determination technique may then be used to find the specific target location.

Various types of location-determination techniques may be used to accomplish localization of the target delivery location once the UAV 200 has navigated to the general area of the target delivery location. For instance, the UAV 200 may be equipped with one or more sensory systems, such as, for example, ultrasonic sensors 204, infrared sensors (not shown), and/or other sensors, which may provide input that the navigation module 214 utilizes to navigate autonomously or semi-autonomously to the specific target location.

As another example, once the UAV 200 reaches the general area of the target delivery location (or of a moving subject such as a person or their mobile device), the UAV 200 may switch to a "fly-by-wire" mode where it is controlled, at least in part, by a remote operator, who can navigate the UAV 200 to the specific target location. To this end, sensory data from the UAV 200 may be sent to the remote operator to assist them in navigating the UAV 200 to the specific location.

As yet another example, the UAV 200 may include a module that is able to signal to a passer-by for assistance in either reaching the specific target delivery location; for example, the UAV 200 may display a visual message requesting such assistance in a graphic display, play an audio message or tone through speakers to indicate the need for such assistance, among other possibilities. Such a visual or audio message might indicate that assistance is needed in delivering the UAV 200 to a particular person or a particular location, and might provide information to assist the passer-by in delivering the UAV 200 to the person or location (e.g., a description or picture of the person or location, and/or the person or location's name), among other possibilities. Such a feature can be useful in a scenario in which the UAV is unable to use sensory functions or another location-determination technique to reach the specific target location. However, this feature is not limited to such scenarios.

In some embodiments, once the UAV 200 arrives at the general area of a target delivery location, the UAV 200 may utilize a beacon from a user's remote device (e.g., the user's mobile phone) to locate the person. Such a beacon may take various forms. As an example, consider the scenario where a remote device, such as the mobile phone of a person who requested a UAV delivery, is able to send out directional signals (e.g., via an RF signal, a light signal and/or an audio signal). In this scenario, the UAV 200 may be configured to navigate by "sourcing" such directional signals—in other words, by determining where the signal is strongest and navigating accordingly. As another example, a mobile device can emit a frequency, either in the human range or outside the human range, and the UAV 200 can listen for that frequency and navigate accordingly. As a related example, if the UAV 200 is listening for spoken commands, then the UAV 200 could utilize spoken statements, such as "I'm over here!" to source the specific location of the person requesting delivery of a payload.

In an alternative arrangement, a navigation module may be implemented at a remote computing device, which communicates wirelessly with the UAV 200. The remote computing device may receive data indicating the operational state of the UAV 200, sensor data from the UAV 200 that allows it to assess the environmental conditions being experienced by the UAV 200, and/or location information for the UAV 200. Provided with such information, the remote computing device may determine altitudinal and/or directional adjustments that should be made by the UAV 200 and/or may determine how the UAV 200 should adjust its mechanical features (e.g., its rudder(s), elevator(s), aileron(s), and/or the speed of its propeller(s)) in order to effectuate such movements. The remote computing system may then communicate such adjustments to the UAV 200 so it can move in the determined manner.

C. Communication Systems

In a further aspect, the UAV 200 includes one or more communication systems 218. The communications systems 218 may include one or more wireless interfaces and/or one or more wireline interfaces, which allow the UAV 200 to communicate via one or more networks. Such wireless interfaces may provide for communication under one or more wireless communication protocols, such as Bluetooth, WiFi (e.g., an IEEE 802.11 protocol), Long-Term Evolution (LTE), WiMAX (e.g., an IEEE 802.16 standard), a radio-frequency ID (RFID) protocol, near-field communication (NFC), and/or other wireless communication protocols. Such wireline interfaces may include an Ethernet interface, a Universal Serial Bus (USB) interface, or similar interface to communicate via a wire, a twisted pair of wires, a coaxial cable, an optical link, a fiber-optic link, or other physical connection to a wireline network.

In some embodiments, a UAV 200 may include communication systems 218 that allow for both short-range communication and long-range communication. For example, the UAV 200 may be configured for short-range communications using Bluetooth and for long-range communications under a CDMA protocol. In such an embodiment, the UAV 200 may be configured to function as a "hot spot;" or in other words, as a gateway or proxy between a remote support device and one or more data networks, such as a cellular network and/or the Internet. Configured as such, the UAV 200 may facilitate data communications that the remote support device would otherwise be unable to perform by itself.

For example, the UAV 200 may provide a WiFi connection to a remote device, and serve as a proxy or gateway to a cellular service provider's data network, which the UAV might connect to under an LTE or a 3G protocol, for instance. The UAV 200 could also serve as a proxy or gateway to a high-altitude balloon network, a satellite network, or a combination of these networks, among others, which a remote device might not be able to otherwise access.

D. Power Systems

In a further aspect, the UAV 200 may include power system(s) 220. The power system 220 may include one or more batteries for providing power to the UAV 200. In one example, the one or more batteries may be rechargeable and each battery may be recharged via a wired connection between the battery and a power supply and/or via a wireless charging system, such as an inductive charging system that applies an external time-varying magnetic field to an internal battery.

In a further aspect, the power systems 220 of UAV 200 a power interface for electronically coupling to an external AC power source, and an AC/DC converter coupled to the power interface and operable to convert alternating current to direct current that charges the UAV's battery or batteries. For instance, the power interface may include a power jack or other electric coupling for connecting to a 110V, 120V, 220V, or 240V AC power source. Such a power system may facilitate a recipient-assisted recharging process, where a recipient can connect the UAV to a standard power source at a delivery location, such as the recipient's home or office. Additionally or alternatively, power systems 220 could include an inductive charging interface, such that recipient-assisted recharging can be accomplished wirelessly via an inductive charging system installed or otherwise available at the delivery location.

E. Payload Delivery

The UAV 200 may employ various systems and configurations in order to transport and deliver a payload 228. In some implementations, the payload 228 of a given UAV 200 may include or take the form of a "package" designed to transport various goods to a target delivery location. For example, the UAV 200 can include a compartment, in which an item or items may be transported. Such a package may one or more food items, purchased goods, medical items, or any other object(s) having a size and weight suitable to be transported between two locations by the UAV. In some embodiments, a payload 228 may simply be the one or more items that are being delivered (e.g., without any package housing the items). And, in some embodiments, the items being delivered, the container or package in which the items are transported, and/or other components may all be considered to be part of the payload.

In some embodiments, the payload 228 may be attached to the UAV and located substantially outside of the UAV during some or all of a flight by the UAV. For example, the package may be tethered or otherwise releasably attached below the UAV during flight to a target location. In an embodiment where a package carries goods below the UAV, the package may include various features that protect its contents from the environment, reduce aerodynamic drag on the system, and prevent the contents of the package from shifting during UAV flight.

For instance, when the payload 228 takes the form of a package for transporting items, the package may include an outer shell constructed of water-resistant cardboard, plastic, or any other lightweight and water-resistant material. Further, in order to reduce drag, the package may feature smooth surfaces with a pointed front that reduces the frontal cross-sectional area. Further, the sides of the package may taper from a wide bottom to a narrow top, which allows the package to serve as a narrow pylon that reduces interference effects on the wing(s) of the UAV. This may move some of the frontal area and volume of the package away from the wing(s) of the UAV, thereby preventing the reduction of lift on the wing(s) cause by the package. Yet further, in some embodiments, the outer shell of the package may be constructed from a single sheet of material in order to reduce air gaps or extra material, both of which may increase drag on the system. Additionally or alternatively, the package may include a stabilizer to dampen package flutter. This reduction in flutter may allow the package to have a less rigid connection to the UAV and may cause the contents of the package to shift less during flight.

In order to deliver the payload, the UAV may include a tether system 221, which may be controlled by the tether control module 216 in order to lower the payload 228 to the ground while the UAV hovers above. The tether system 221 may include a tether, which is couplable to a payload 228 (e.g., a package). The tether 224 may be wound on a spool that is coupled to a motor 222 of the UAV (although passive implementations, without a motor, are also possible). The motor may be a DC motor (e.g., a servo motor) that can be actively controlled by a speed controller, although other motor configurations are possible. In some embodiments, the tether control module 216 can control the speed controller to cause the 222 to rotate the spool, thereby unwinding or retracting the tether and lowering or raising the payload coupling apparatus. In practice, a speed controller may output a desired operating rate (e.g., a desired RPM) for the spool, which may correspond to the speed at which the tether system should lower the payload towards the ground. The motor may then rotate the spool so that it maintains the desired operating rate (or within some allowable range of operating rates).

In order to control the motor via a speed controller, the tether control module 216 may receive data from a speed sensor (e.g., an encoder) configured to convert a mechanical position to a representative analog or digital signal. In particular, the speed sensor may include a rotary encoder that may provide information related to rotary position (and/or rotary movement) of a shaft of the motor or the spool coupled to the motor, among other possibilities. Moreover, the speed sensor may take the form of an absolute encoder and/or an incremental encoder, among others. So in an example implementation, as the motor causes rotation of the spool, a rotary encoder may be used to measure this rotation. In doing so, the rotary encoder may be used to convert a rotary position to an analog or digital electronic signal used by the tether control module 216 to determine the amount of rotation of the spool from a fixed reference angle and/or to an analog or digital electronic signal that is representative of a new rotary position, among other options. Other examples are also possible.

In some embodiments, a payload coupling component (e.g., a hook or another type of coupling component) can be configured to secure the payload 228 while being lowered from the UAV by the tether. The coupling apparatus or component and can be further configured to release the payload 228 upon reaching ground level via electrical or electro-mechanical features of the coupling component. The payload coupling component can then be retracted to the UAV by reeling in the tether using the motor.

In some implementations, the payload 228 may be passively released once it is lowered to the ground. For example, a payload coupling component may provide a passive release mechanism, such as one or more swing arms adapted to retract into and extend from a housing. An extended swing arm may form a hook on which the payload 228 may be attached. Upon lowering the release mechanism and the payload 228 to the ground via a tether, a gravitational force as well as a downward inertial force on the release mechanism may cause the payload 228 to detach from the hook allowing the release mechanism to be raised upwards toward the UAV. The release mechanism may further include a spring mechanism that biases the swing arm to retract into the housing when there are no other external forces on the swing arm. For instance, a spring may exert a force on the swing arm that pushes or pulls the swing arm toward the housing such that the swing arm retracts into the housing once the weight of the payload 228 no longer forces the swing arm to extend from the housing. Retracting the swing arm into the housing may reduce the likelihood of the release mechanism snagging the payload 228 or other nearby objects when raising the release mechanism toward the UAV upon delivery of the payload 228.

In another implementation, a payload coupling component may include a hook feature that passively releases the payload when the payload contacts the ground. For example, the payload coupling component may take the form of or include a hook feature that is sized and shaped to interact with a corresponding attachment feature (e.g., a handle or hole) on a payload taking the form of a container or tote. The hook may be inserted into the handle or hole of the payload container, such that the weight of the payload keeps the payload container secured to the hook feature during flight. However, the hook feature and payload container may be designed such that when the container contacts the ground and is supported from below, the hook feature slides out of the container's attachment feature, thereby passively releasing the payload container. Other passive release configurations are also possible.

Active payload release mechanisms are also possible. For example, sensors such as a barometric pressure based altimeter and/or accelerometers may help to detect the position of the release mechanism (and the payload) relative to the ground. Data from the sensors can be communicated back to the UAV and/or a control system over a wireless link and used to help in determining when the release mechanism has reached ground level (e.g., by detecting a measurement with the accelerometer that is characteristic of ground impact). In other examples, the UAV may determine that the payload has reached the ground based on a weight sensor detecting a threshold low downward force on the tether and/or based on a threshold low measurement of power drawn by the winch when lowering the payload.

Other systems and techniques for delivering a payload, in addition or in the alternative to a tethered delivery system are also possible. For example, a UAV 200 could include an air-bag drop system or a parachute drop system. Alternatively, a UAV 200 carrying a payload could simply land on the ground at a delivery location. Other examples are also possible.

In some arrangements, a UAV may not include a tether system 221. For example, a UAV could include an internal compartment or bay in which the UAV could hold items during transport. Such a compartment could be configured as a top-loading, side-loading, and/or bottom-loading chamber. The UAV may include electrical and/or mechanical means (e.g., doors) that allow the interior compartment in the UAV to be opened and closed. Accordingly, the UAV may open the compartment in various circumstances, such as: (a) when picking up an item for delivery at an item source location, such that the item can be placed in the UAV for delivery, (b) upon arriving at a delivery location, such that the recipient can place an item for return into the UAV, and/or (c) in other circumstances. Further, it is also contemplated, that other non-tethered mechanisms for securing payload items to a UAV are also possible, such as various fasteners for securing items to the UAV housing, among other possibilities. Yet further, a UAV may include an internal compartment for transporting items and/or other non-tethered mechanisms for securing payload items, in addition or in the alternative to a tether system 221.

IV. ILLUSTRATIVE UAV DEPLOYMENT SYSTEMS

Figure 3:
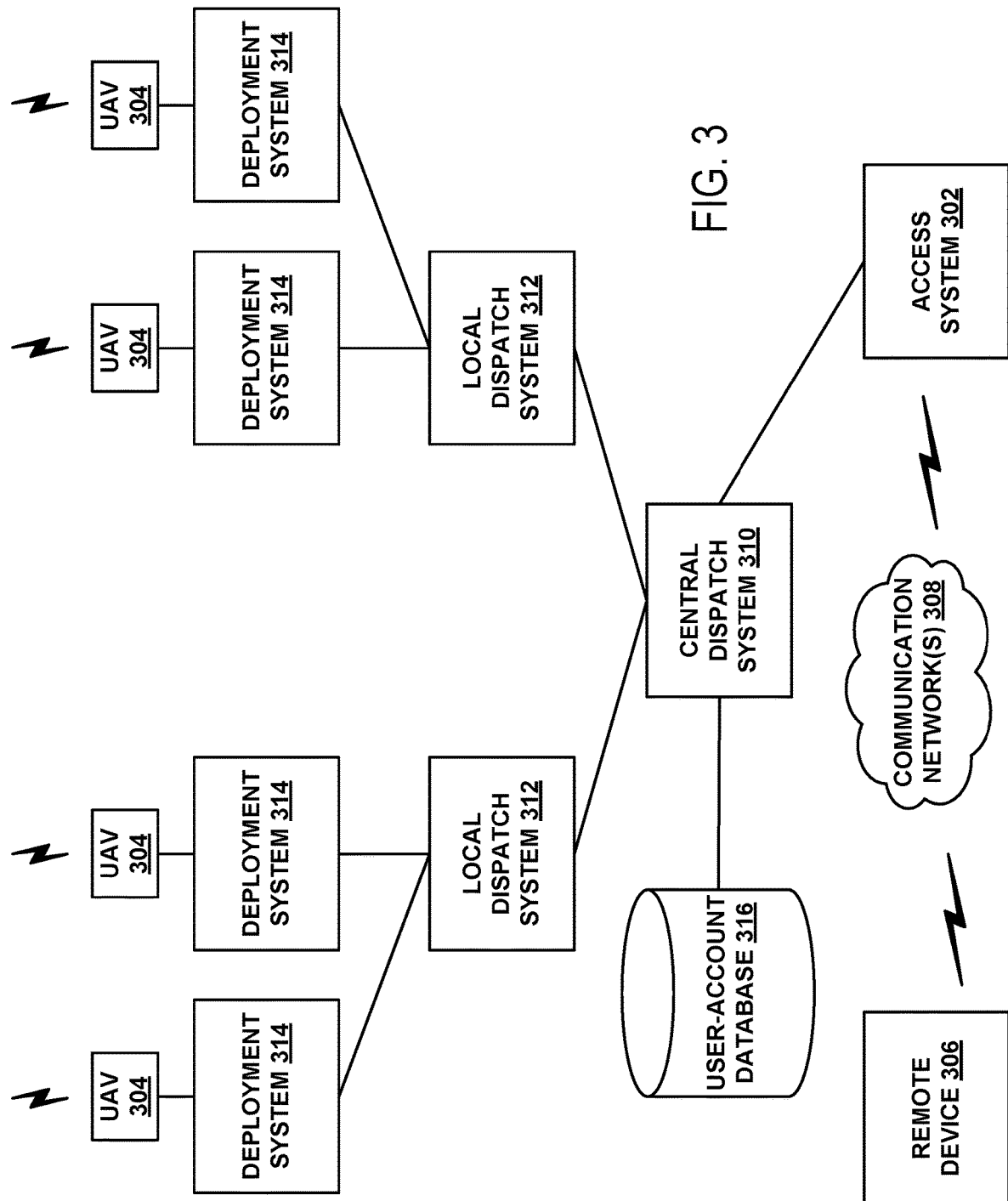
FIG. 3 is a simplified block diagram illustrating a distributed UAV system, according to example implementations.

UAV systems may be implemented in order to provide various UAV-related services. In particular, UAVs may be provided at a number of different launch sites that may be in communication with regional and/or central control systems. Such a distributed UAV system may allow UAVs to be quickly deployed to provide services across a large geographic area (e.g., that is much larger than the flight range of any single UAV). For example, UAVs capable of carrying payloads may be distributed at a number of launch sites across a large geographic area (possibly even throughout an entire country, or even worldwide), in order to provide on-demand transport of various items to locations throughout the geographic area. FIG. 3 is a simplified block diagram illustrating a distributed UAV system 300, according to an example embodiment.

In the illustrative UAV system 300, an access system 302 may allow for interaction with, control of, and/or utilization of a network of UAVs 304. In some embodiments, an access system 302 may be a computing system that allows for human-controlled dispatch of UAVs 304. As such, the control system may include or otherwise provide a user interface through which a user can access and/or control the UAVs 304.

In some embodiments, dispatch of the UAVs 304 may additionally or alternatively be accomplished via one or more automated processes. For instance, the access system 302 may dispatch one of the UAVs 304 to transport a payload to a target location, and the UAV may autonomously navigate to the target location by utilizing various on-board sensors, such as a GPS receiver and/or other various navigational sensors.

Further, the access system 302 may provide for remote operation of a UAV. For instance, the access system 302 may allow an operator to control the flight of a UAV via its user interface. As a specific example, an operator may use the access system 302 to dispatch a UAV 304 to a target location. The UAV 304 may then autonomously navigate to the general area of the target location. At this point, the operator may use the access system 302 to take control of the UAV 304 and navigate the UAV to the target location (e.g., to a particular person to whom a payload is being transported). Other examples of remote operation of a UAV are also possible.

In an illustrative embodiment, the UAVs 304 may take various forms. For example, each of the UAVs 304 may be a UAV such as those illustrated in FIG. 1, 2, 3, or 4. However, UAV system 300 may also utilize other types of UAVs without departing from the scope of the invention. In some implementations, all of the UAVs 304 may be of the same or a similar configuration. However, in other implementations, the UAVs 304 may include a number of different types of UAVs. For instance, the UAVs 304 may include a number of types of UAVs, with each type of UAV being configured for a different type or types of payload delivery capabilities.

The UAV system 300 may further include a remote device 306, which may take various forms. Generally, the remote device 306 may be any device through which a direct or indirect request to dispatch a UAV can be made. (Note that an indirect request may involve any communication that may be responded to by dispatching a UAV, such as requesting a package delivery). In an example embodiment, the remote device 306 may be a mobile phone, tablet computer, laptop computer, personal computer, or any network-connected computing device. Further, in some instances, the remote device 306 may not be a computing device. As an example, a standard telephone, which allows for communication via plain old telephone service (POTS), may serve as the remote device 306. Other types of remote devices are also possible.

Further, the remote device 306 may be configured to communicate with access system 302 via one or more types of communication network(s) 308. For example, the remote device 306 may communicate with the access system 302 (or a human operator of the access system 302) by communicating over a POTS network, a cellular network, and/or a data network such as the Internet. Other types of networks may also be utilized.

In some embodiments, the remote device 306 may be configured to allow a user to request pick-up of one or more items from a certain source location and/or delivery of one or more items to a desired location. For example, a user could request UAV delivery of a package to their home via their mobile phone, tablet, or laptop. As another example, a user could request dynamic delivery to wherever they are located at the time of delivery. To provide such dynamic delivery, the UAV system 300 may receive location information (e.g., GPS coordinates, etc.) from the user's mobile phone, or any other device on the user's person, such that a UAV can navigate to the user's location (as indicated by their mobile phone).

In some embodiments, a business user (e.g., a restaurant) could utilize one or more remote devices 306 to request that a UAV be dispatched to pick-up one or more items (e.g., a food order) from a source location (e.g., the restaurant's address), and then deliver the one or more items to a target location (e.g., a customer's address). Further, in such embodiments, there may be a number of remote devices 306 associated with a common item-provider account (e.g., an account used by multiple employees and/or owners of a particular restaurant). Additionally, in such embodiments, a remote device 306 may be utilized to send item-provider submissions to a transport-provider computing system (e.g., central dispatch system 310 and or local dispatch system 312), which each indicate a respective quantitative measure for a given amount of UAV transport service at a given future time. For example, remote device 306 may be utilized to generate and send an item-provider submission that specifies a level of desired UAV transport services (e.g., number and/or rate of expected UAV delivery flights), and/or a monetary value corresponding to the item provider's need for UAV transport services, at a particular time or during a particular period of time in the future.

In an illustrative arrangement, the central dispatch system 310 may be a server or group of servers, which is configured to receive dispatch messages requests and/or dispatch instructions from the access system 302. Such dispatch messages may request or instruct the central dispatch system 310 to coordinate the deployment of UAVs to various target locations. The central dispatch system 310 may be further configured to route such requests or instructions to one or more local dispatch systems 312. To provide such functionality, the central dispatch system 310 may communicate with the access system 302 via a data network, such as the Internet or a private network that is established for communications between access systems and automated dispatch systems.

In the illustrated configuration, the central dispatch system 310 may be configured to coordinate the dispatch of UAVs 304 from a number of different local dispatch systems 312. As such, the central dispatch system 310 may keep track of which UAVs 304 are located at which local dispatch systems 312, which UAVs 304 are currently available for deployment, and/or which services or operations each of the UAVs 304 is configured for (in the event that a UAV fleet includes multiple types of UAVs configured for different services and/or operations). Additionally or alternatively, each local dispatch system 312 may be configured to track which of its associated UAVs 304 are currently available for deployment and/or are currently in the midst of item transport.

In some cases, when the central dispatch system 310 receives a request for UAV-related service (e.g., transport of an item) from the access system 302, the central dispatch system 310 may select a specific UAV 304 to dispatch. The central dispatch system 310 may accordingly instruct the local dispatch system 312 that is associated with the selected UAV to dispatch the selected UAV. The local dispatch system 312 may then operate its associated deployment system 314 to launch the selected UAV. In other cases, the central dispatch system 310 may forward a request for a UAV-related service to a local dispatch system 312 that is near the location where the support is requested and leave the selection of a particular UAV 304 to the local dispatch system 312.

In an example configuration, the local dispatch system 312 may be implemented as a computing system at the same location as the deployment system(s) 314 that it controls. For example, the local dispatch system 312 may be implemented by a computing system installed at a building, such as a warehouse, where the deployment system(s) 314 and UAV(s) 304 that are associated with the particular local dispatch system 312 are also located. In other embodiments, the local dispatch system 312 may be implemented at a location that is remote to its associated deployment system(s) 314 and UAV(s) 304.

Numerous variations on and alternatives to the illustrated configuration of the UAV system 300 are possible. For example, in some embodiments, a user of the remote device 306 could request delivery of a package directly from the central dispatch system 310. To do so, an application may be implemented on the remote device 306 that allows the user to provide information regarding a requested delivery, and generate and send a data message to request that the UAV system 300 provide the delivery. In such an embodiment, the central dispatch system 310 may include automated functionality to handle requests that are generated by such an application, evaluate such requests, and, if appropriate, coordinate with an appropriate local dispatch system 312 to deploy a UAV.

Further, some or all of the functionality that is attributed herein to the central dispatch system 310, the local dispatch system(s) 312, the access system 302, and/or the deployment system(s) 314 may be combined in a single system, implemented in a more complex system (e.g., having more layers of control), and/or redistributed among the central dispatch system 310, the local dispatch system(s) 312, the access system 302, and/or the deployment system(s) 314 in various ways.

Yet further, while each local dispatch system 312 is shown as having two associated deployment systems 314, a given local dispatch system 312 may alternatively have more or fewer associated deployment systems 314. Similarly, while the central dispatch system 310 is shown as being in communication with two local dispatch systems 312, the central dispatch system 310 may alternatively be in communication with more or fewer local dispatch systems 312.

In a further aspect, the deployment systems 314 may take various forms. In some implementations, some or all of the deployment systems 314 may be a structure or system that passively facilitates a UAV taking off from a resting position to begin a flight. For example, some or all of the deployment systems 314 may take the form of a landing pad, a hangar, and/or a runway, among other possibilities. As such, a given deployment system 314 may be arranged to facilitate deployment of one UAV 304 at a time, or deployment of multiple UAVs (e.g., a landing pad large enough to be utilized by multiple UAVs concurrently).

Additionally or alternatively, some or all of deployment systems 314 may take the form of or include systems for actively launching one or more of the UAVs 304. Such launch systems may include features that provide for an automated UAV launch and/or features that allow for a human-assisted UAV launch. Further, a given deployment system 314 may be configured to launch one particular UAV 304, or to launch multiple UAVs 304.

Note that deployment systems 314 may also be configured to passively facilitate and/or actively assist a UAV when landing. For example, the same landing pad could be used for take-off and landing. Additionally or alternatively, a deployment system could include a robotic arm operable to receive an incoming UAV. A deployment system 314 could also include other structures and/or systems to assist and/or facilitate UAV landing processes. Further, structures and/or systems to assist and/or facilitate UAV landing processes may be implemented as separate structures and/or systems, so long as UAVs can move or be moved from a landing structure or system to a deployment system 314 for re-deployment.

The deployment systems 314 may further be configured to provide additional functions, including for example, diagnostic-related functions such as verifying system functionality of the UAV, verifying functionality of devices that are housed within a UAV (e.g., a payload delivery apparatus), and/or maintaining devices or other items that are housed in the UAV (e.g., by monitoring a status of a payload such as its temperature, weight, etc.).

In some embodiments, local dispatch systems 312 (along with their respective deployment system(s) 314 may be strategically distributed throughout an area such as a city. For example, local dispatch systems 312 may be strategically distributed such that each local dispatch systems 312 is proximate to one or more payload pickup locations (e.g., near a restaurant, store, or warehouse). However, the local dispatch systems 312 may be distributed in other ways, depending upon the particular implementation.

As an additional example, kiosks that allow users to transport packages via UAVs may be installed in various locations. Such kiosks may include UAV launch systems, and may allow a user to provide their package for loading onto a UAV and pay for UAV shipping services, among other possibilities. Other examples are also possible.

In a further aspect, the UAV system 300 may include or have access to a user-account database 316. The user-account database 316 may include data for a number of user accounts, and which are each associated with one or more person. For a given user account, the user-account database 316 may include data related to or useful in providing UAV-related services. Typically, the user data associated with each user account is optionally provided by an associated user and/or is collected with the associated user's permission.

Further, in some embodiments, a person may be required to register for a user account with the UAV system 300, if they wish to be provided with UAV-related services by the UAVs 304 from UAV system 300. As such, the user-account database 316 may include authorization information for a given user account (e.g., a user name and password), and/or other information that may be used to authorize access to a user account.

In some embodiments, a person may associate one or more of their devices with their user account, such that they can access the services of UAV system 300. For example, when a person uses an associated mobile phone to, e.g., place a call to an operator of the access system 302 or send a message requesting a UAV-related service to a dispatch system, the phone may be identified via a unique device identification number, and the call or message may then be attributed to the associated user account. Other examples are also possible.

Additionally or alternatively, an item provider that wishes to deliver their products using UAV transport services provided by an ATSP to deliver, can register for an item-provider account with the UAV system 300. As such, the user-account database 316 may include authorization information for a given item-provider account (e.g., one or more user name and password combinations), and/or other information that may be used to authorize access to a given item-provider account. Alternatively, data for item-provider accounts may be kept in a separate database from recipient user accounts. Other data structures and storage configurations for storing such account data are also possible.

V. UAV TRANSPORT SERVICES WITH SEPARATELY LOCATED ITEM PROVIDERS AND UAV HUBS

As noted above, an ATSP may be a separate entity from the entity or entities that provide the items being transported and/or interface with the recipients who request delivery of these items. For example, a company that operates a fleet of UAVs configured for item delivery may provide delivery services for third-party entities, such as restaurants, clothing stores, grocery stores, and other "brick and mortar" and/or online retailers, among other possibilities. These third-party entities may have accounts with the UAV transport service provider, via which the third-parties can request and/or purchase UAV transport services from the transport service provider. Further, the third-party entities could interface with recipients (e.g., customers) directly, or through computing systems (e.g., applications and/or server systems) provided by the UAV transport service provider.

Figure 4:
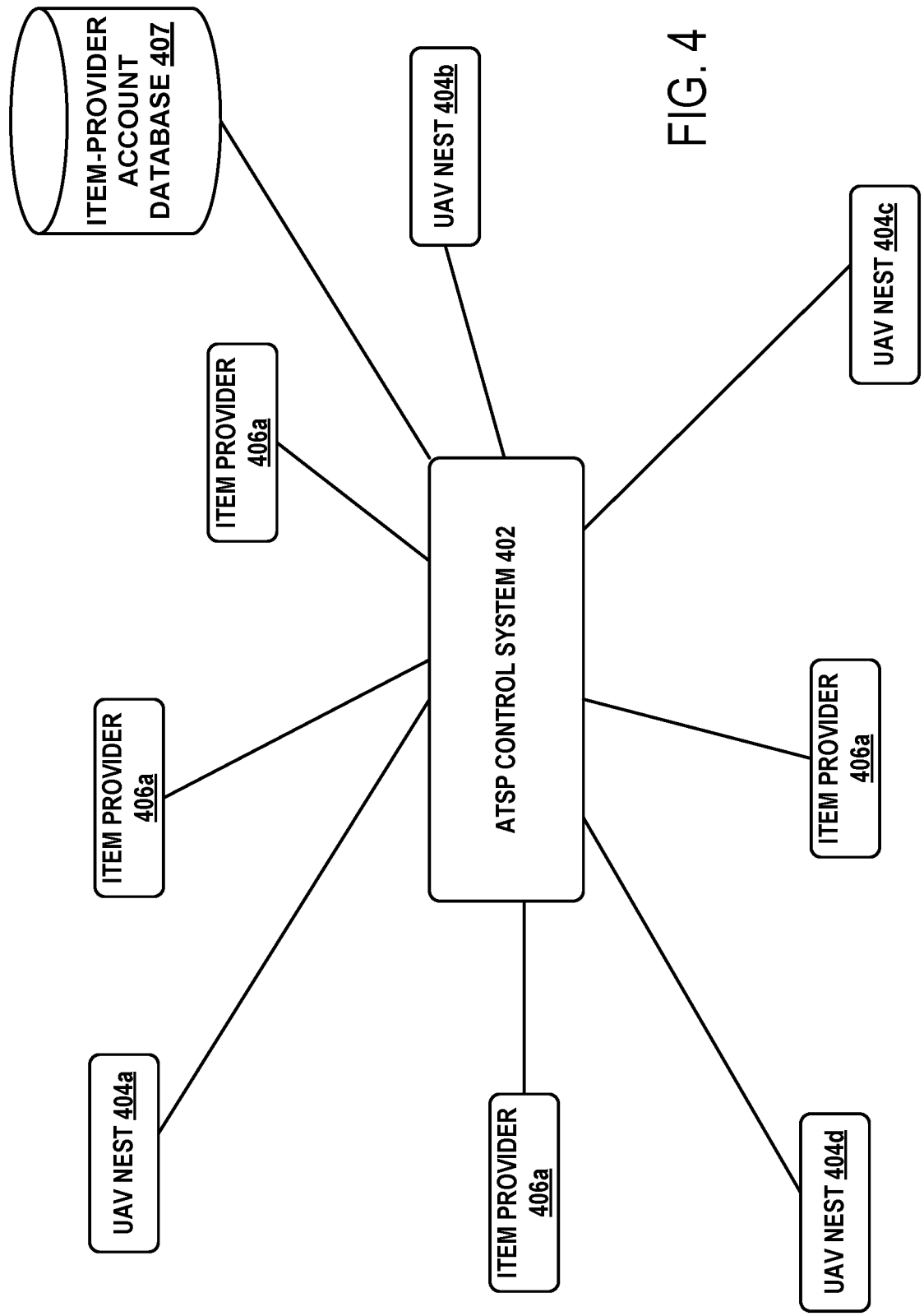
FIG. 4 is a block diagram showing an example arrangement for an aerial transport provider control system, according to example implementations.

FIG. 4 is a block diagram showing an example arrangement for an aerial transport provider control system 402, which coordinates UAV transport services for a plurality of item providers that are located remotely from the service provider's dispatch locations, and served by a plurality of UAV hubs at various locations. As shown, an aerial transport service provider (ATSP) 402 may be communicatively coupled to UAV nests 404a to 404d, and communicatively coupled to item-provider computing systems 406a to 406d. Such communicative couplings may be implemented using various types of wired and/or wireless communication protocols and networks.

Each UAV nest 404a to 404d is a facility where UAVs can be stored for at least a short period of time, and from which UAVs can begin carrying out a UAV transport task (e.g., where UAVs can take off). In some implementations, some or all of UAV nests 404a to 404d may take the form of a local dispatch system and one or more deployment systems, such as those described in reference to FIG. 3 above. Of course, some or all UAV nests 404a to 404d could also take other forms and/or perform different functions.

Each item-provider computing system 406a to 406d may be associated with a different item-provider account. As such, a given item-provider computing system 406a to 406d may include one or more computing devices that are authorized to access the corresponding item-provider account with ATSP 402. Further, ATSP 402 may store data for item-provider accounts in an item-provider account database 407.

In practice, a given item-provider computing system 406a to 406d may include one or more remote computing devices (e.g., such as one or more remote devices 306 described in reference to FIG. 3), which have logged in to or otherwise been authorized to access the same item-provider account (e.g., cell phones, laptops, and/or computing devices of a business's employees). Additionally or alternatively, an item-provider computing system 406a to 406d may be implemented with less of an ad-hoc approach; e.g., with one or more dedicated user-interface terminals installed at the item provider's facilities. Other types of item-provider computing systems are also possible.

In order to provide UAV transport services to various item providers in an efficient and flexible manner, a UAV transport service provider 402 may dynamically assign different UAVs to transport tasks for different item providers based on demand and/or other factors, rather than permanently assigning each UAV to a particular item provider. As such, the particular UAV or UAVs that carry out transport tasks for a given third-party item provider may vary over time.

The dynamic assignment of UAVs to flights for a number of different item providers can help a UAV transport service provider to more efficiently utilize a group of UAVs (e.g., by reducing unnecessary UAV downtime), as compared to an arrangement where specific UAVs are permanently assigned to specific item providers. More specifically, to dynamically assign UAVs to transport requests from third-party item providers, the UAV transport service provider 402 can dynamically redistribute UAVs amongst a number of UAV deployment locations (which may be referred to as, e.g., "hubs" or "nests") through a service area, according to time-varying levels of demand at various locations or sub-areas within the service area.

With such an arrangement, a delivery flight may involve the additional flight leg to fly from the UAV hub to the item-provider's location to pick up the item or items for transport, before flying to the delivery location, as compared to an arrangement where delivery UAVs are stationed at the source location for items (such as a distributor or retailer warehouse or a restaurant). While the flight leg between the UAV hub and a pick-up location has associated costs, these costs can be offset by more efficient use of each UAV (e.g., more flights, and less unnecessary ground time, in a given period of time), which in turn can allow for a lesser number of UAVs to be utilized for a given number of transport tasks.

VI. UAV HAVING DOORS THAT ENABLE LOADING AND RELEASE OF PAYLOADS

Disclosed herein is a UAV that is arranged for door-enabled loading and release of a payload. In practice, the disclosed UAV may take on any feasible form, such as any one of the forms described herein. For instance, the disclosed UAV may take the form of a quadcopter UAV or of a tail-sitter UAV, among other possibilities. In a specific example, UAV 100 could have door(s) arranged on the fuselage 106, and may be configured to carry out operations in accordance with the present disclosure. Moreover, the disclosed UAV may include any combination of the above-described UAV features, among others.

In accordance with the present disclosure, the disclosed UAV may have several features that provide for door-enabled loading and release of a payload. These features include a control system, a fuselage, a chamber, and a first and a second door. And these features may be arranged in any feasible manner that provides for door-enabled loading and release of a payload.

More specifically, the disclosed UAV may have a control system on-board and/or may be in communication with an external control system. In any case, the control system may include one or more processors (e.g., processor(s) 208) configured to execute computer-readable program instructions that are stored in data storage and are executable to provide the functionality of the disclosed UAV, such as to control flight and/or other operations of the UAV.

Additionally, the disclosed UAV may include a fuselage (e.g., fuselage 1104), which may be the aircraft's main body section. Generally, the fuselage may take on any feasible shape, form, and size, and may be coupled to other UAV features, such as to wing(s), to a propulsion unit, and/or to landing gear, among others. Moreover, the fuselage may contain, for example, the control system, batteries, sensor(s), and/or a payload, among other possibilities.

In an example implementation, a chamber may be formed within the fuselage of the disclosed UAV and arranged to house a payload. The chamber could be an enclosed space or cavity within the fuselage, among other options. Also, the chamber could take on any feasible shape, form and size. For instance, the chamber could be specifically arranged to house specific types of payloads, such as item(s) of a particular size and/or of a particular shape, for instance.

Further, the disclosed UAV may have a first door arranged on a first side of the fuselage as well as a second door arrange on a second side of the fuselage. Generally, the first and second sides may be different from one another or may be the same side. Additionally, the first and second doors could each respectively take on any form. For example, a door could be a hinged-door that is connected to the fuselage by way of one or more hinges, thereby allowing the door to swing open and close. In another example, a door could be a sliding door, which could mounted on, suspended from, or otherwise coupled to a track, thereby allowing the door to slide open and close substantially parallel to a surface of the fuselage. In yet other examples, a door could be a revolving door, a pivot door, a bypass door, and/or a bifold door, among others.

Generally, the opening and closing of the first and/or second doors may be carried out manually by an individual and/or may be automatic. In the case of manual opening/closing of one or both of the first and second doors, an individual may apply certain directional force(s) that cause opening and/or closing of a given door. And in the case of automatic control of the door(s), the disclosed UAV could control the opening and/or closing of one or both of the first and second doors, and do so in various ways. For example, a linear or rotary actuator could be coupled to a given one of the doors, and the UAV's control system may send signal(s) to that actuator that cause the actuator to apply force(s) to the given door, which may in turn cause opening and/or closing of the given door. Other examples are also possible.

Moreover, each of the first and second doors may respectively provide access to the chamber, so as to provide for the disclosed door-enabled loading and release of a payload. In particular, an opening of the first door may enable loading of a payload into the chamber via the first side of the disclosed UAV's fuselage. And an opening of the second door may enable release of the payload from the chamber via the second side of the disclosed UAV's fuselage. Moreover, when the first and second doors are closed, a payload can be safely secured within the fuselage during flight and/or other operations by the disclosed UAV. In any case, the loading and release of the payload could be carried out in various ways.

In an example arrangement, one of the first and second doors may be a top door and the other one of the first and second doors may be a bottom door. In particular, one of the sides of the fuselage may be a bottom side that is substantially oriented towards the ground during flight of the UAV, and another side of the fuselage may be a top side that is substantially opposite the bottom side. Given this, the top door may be arranged on the top side of the fuselage and the bottom door may be arranged on the bottom side of the fuselage.

In one implementation, this top and bottom door arrangement may provide for top loading of a payload. In particular, an opening of the top door may enable loading of a payload into the chamber via the top side of the disclosed UAV's fuselage. Generally, the top loading could be useful for various reasons.

For example, if the UAV lands on the ground when at a pickup location for pickup of a payload, an opening of the top door may serve as an indication (e.g., to an individual) that the payload should be loaded into the chamber via the top door. In another example, assuming that the UAV is arranged to substantially land on the bottom side, the top loading may allow the UAV to land, rather than fly (e.g., hover), during pickup of the payload, thereby reducing the amount of energy being used by the UAV during pickup, among other advantages. In yet another example, the top loading of the payload may be carried out by an individual, which may be advantageous when the payload at issue is a high-value item that ideally should not be left unattended. Other examples and advantages are also possible.

In another implementation, this top and bottom door arrangement may provide for bottom release of a payload. In particular, an opening of the bottom door may enable release of the payload from the chamber via the bottom side of the disclosed UAV's fuselage. Generally, such bottom release of the payload could be carried out in one of various ways, such as through a drop of the payload from the chamber (e.g., while the UAV is hovering substantially proximate to the ground) or through a tethered delivery of the payload, among others. Nonetheless, the bottom release could be useful for various reasons.

For example, when the UAV is at a delivery location and the payload at issue is not a high-value item that ideally should not be left unattended, the UAV may release the payload via the bottom door without necessarily having to wait for an individual to be present to carry out the unloading of the payload (e.g., via the top door), thereby reducing the amount of time the UAV spends on delivery of the payload. In contrast, when the payload at issue is a high-value item, then the UAV could wait for an individual to be present at the delivery location before releasing the item via the bottom door. Other examples and advantages are also possible.

In yet another implementation, this top and bottom door arrangement may provide for top release of a payload. In particular, an opening of the top door may enable release/unloading of the payload from the chamber via the top side of the disclosed UAV's fuselage. Generally, the top release could be useful for various reasons.

For example, if the UAV lands on the ground when at a delivery location for delivery of the payload, an opening of the top door may serve as an indication (e.g., to an individual) that the payload should be released or otherwise unloaded from the chamber via the top door. Additionally, such top release may allow the UAV to land, rather than fly (e.g., hover), during delivery of the payload, thereby reducing the amount of energy being used by the UAV during delivery, among other advantages. Further, such top release/unloading may be carried out by an individual, which may be advantageous when the payload at issue is a high-value item that ideally should not be left unattended. Other examples and advantages are also possible.

In yet another implementation, this top and bottom door arrangement may provide for bottom loading of a payload. In particular, an opening of the bottom door may enable loading of a payload into the chamber via the bottom side of the disclosed UAV's fuselage. Generally, the bottom loading could be useful for various reasons.

For example, the UAV may hover when at a pickup location for pickup of a payload, which may allow an individual to load the payload onto the UAV via the bottom door. In practice, such a bottom loading approach may be advantageous in a situation where there is no feasible location at which the UAV can land, among other possibilities. Other examples and advantages are also possible.

In accordance with the present disclosure, these various implementations of the top and bottom door arrangement may allow the UAV to carry out pick up and/or delivery payload(s) according to one or more of various possible approaches. In one case, the disclosed UAV may carry out top loading and bottom release of a payload. In another case, the disclosed UAV may carry out bottom loading and top release of a payload. In yet another case, the disclosed UAV may carry out top loading and top release of a payload. In yet another case, the disclosed UAV may carry out bottom loading and bottom release of a payload. In any case, any one of top loading, bottom loading, top release, and bottom release of a payload could be carried out while the UAV is in-flight (e.g., hovering) and/or after the UAV has landed (e.g., on a ground surface), among other possibilities. Other cases are possible as well.

Moreover, the disclosed UAV may have various features that could enhance safety during pickup and delivery of a payload. In particular, the disclosed UAV may be a lightweight UAV having a weight that is below a threshold weight. For example, the disclosed UAV may have a weight that meets regulations for UAVs permitted to fly in the vicinity of individual(s), such as regulations set by the Federal Aviation Administration (FAA), for instance. In another example, as further discussed herein, the disclosed UAV may have a weight that is suitable for carrying smaller and/or lighter items, which would allow for use of the disclosed UAV as part of a group that includes various types of UAVs each respectively suitable for carrying items of certain sizes or weights. Additionally or alternatively, the UAV may have a propulsion unit including propeller(s) that are unexposed and are thus prevented from making contact with an individual. For example, the disclosed UAV may have a shrouded propeller design. Other examples are possible as well.

FIGS. 5A to 5D next illustrate a UAV 500 arranged in accordance with the present disclosure, such as for door-enabled loading and release of a payload. Although, the UAV 500 is shown as taking the form of a quadcopter UAV, a UAV arranged in accordance with the present disclosure could take on any feasible form.

Figure 5A:
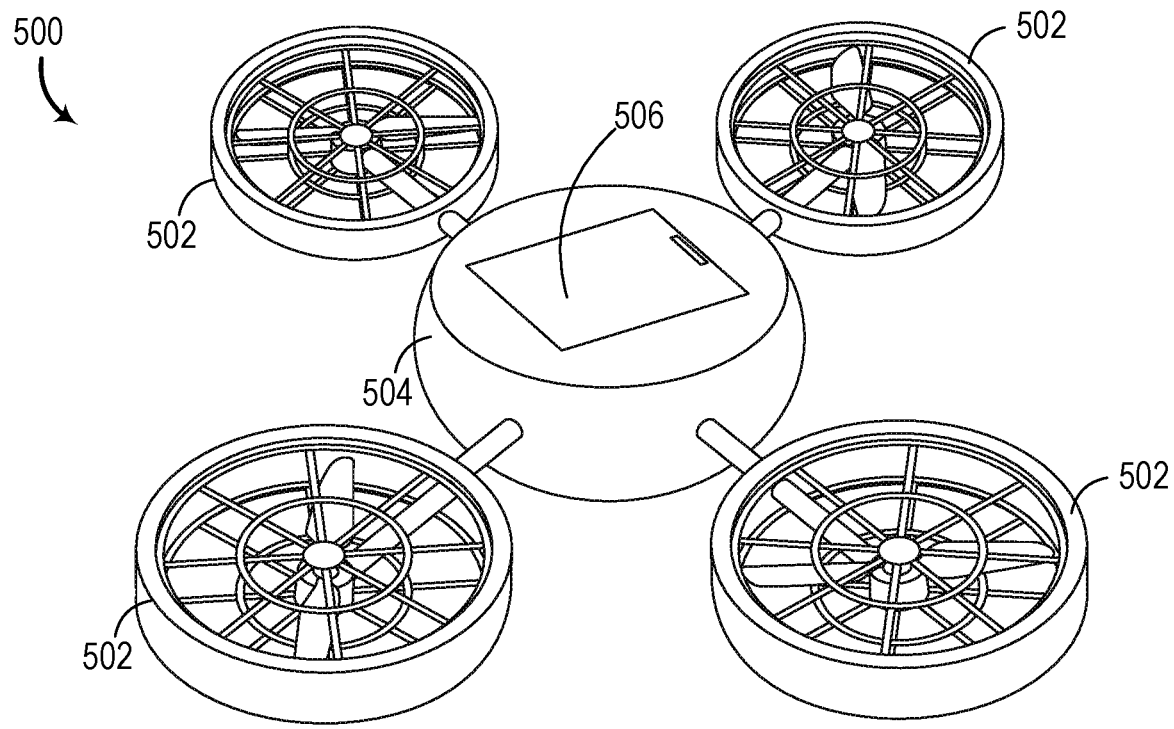
FIGS. 5A to 5D are simplified illustrations of an unmanned aerial vehicle having a top and a bottom door, according to example implementations.
Figure 5B:
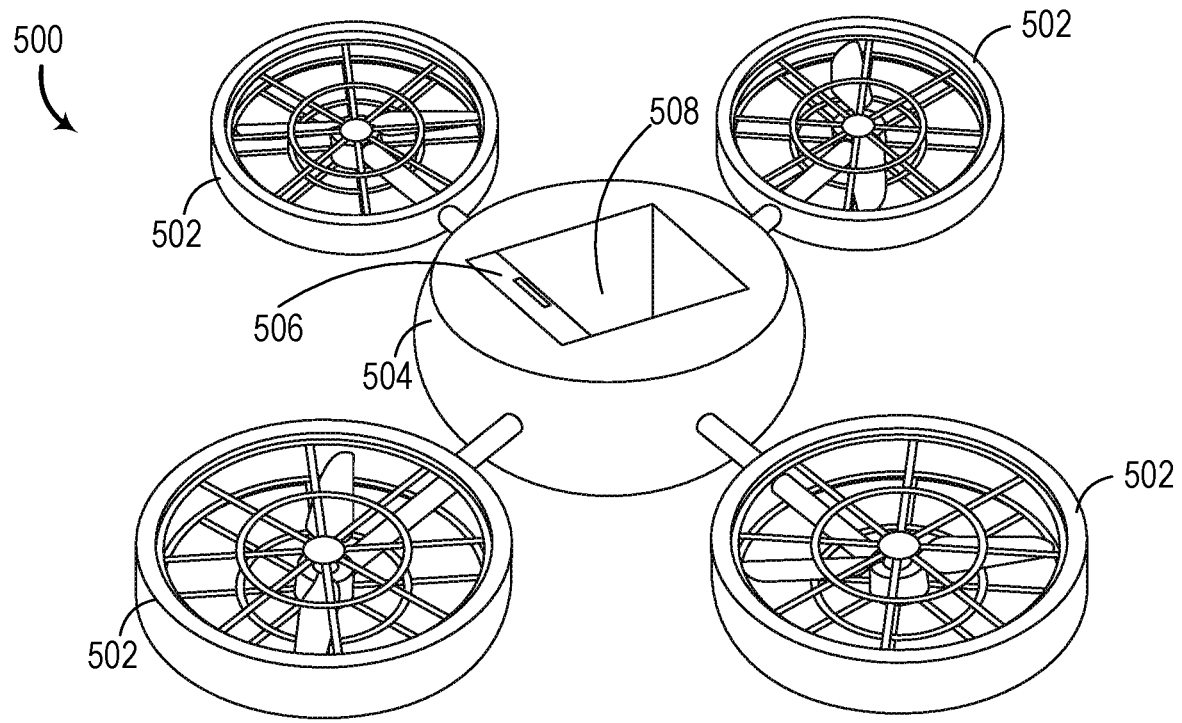

FIGS. 5A to 5B illustrate a top perspective in which a top side of the UAV 500 is shown. As shown, the UAV 500 includes a propulsion unit 502 having unexposed propellers that are surrounded by a casing. Additionally, the UAV 500 includes a fuselage 504 to which the propulsion unit 502 is connected. Further, the UAV 500 includes a door 506 (e.g., a sliding door) arranged on the top side of the fuselage 504. And an opening of the door 506 provides access to a chamber 508 formed within the fuselage, thereby providing for loading of a payload onto the chamber 508 via the top side and/or release of a payload from the chamber 508 via the top side.

Figure 5C:
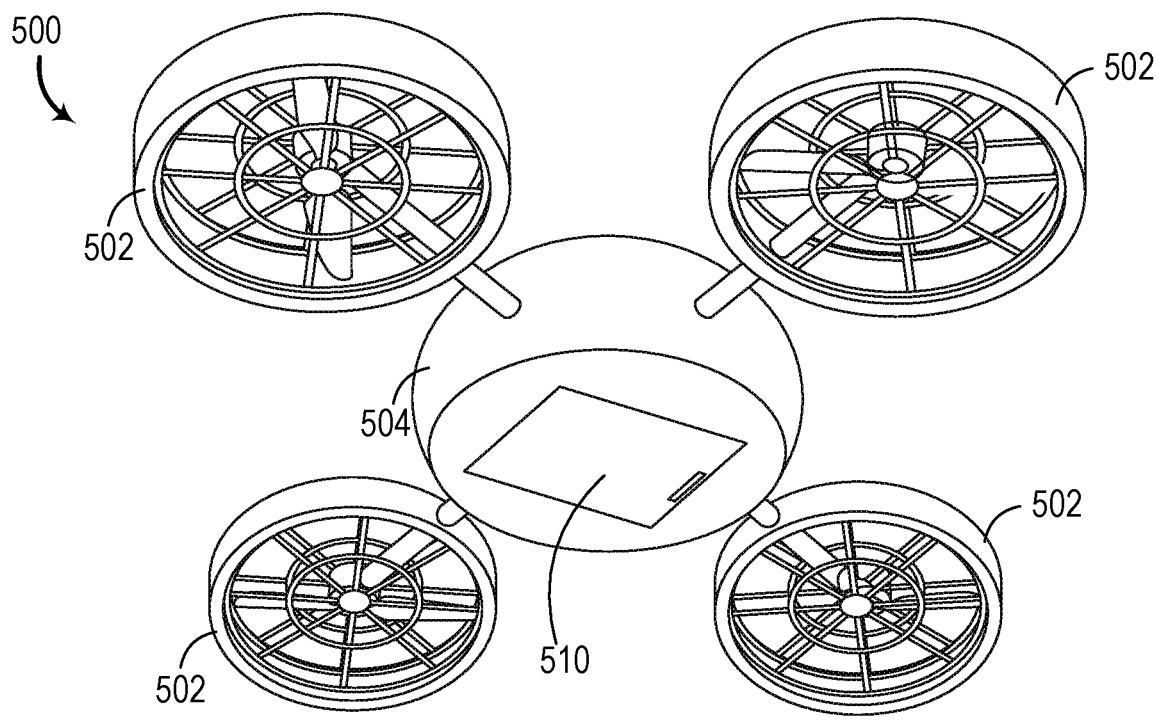
Figure 5D:
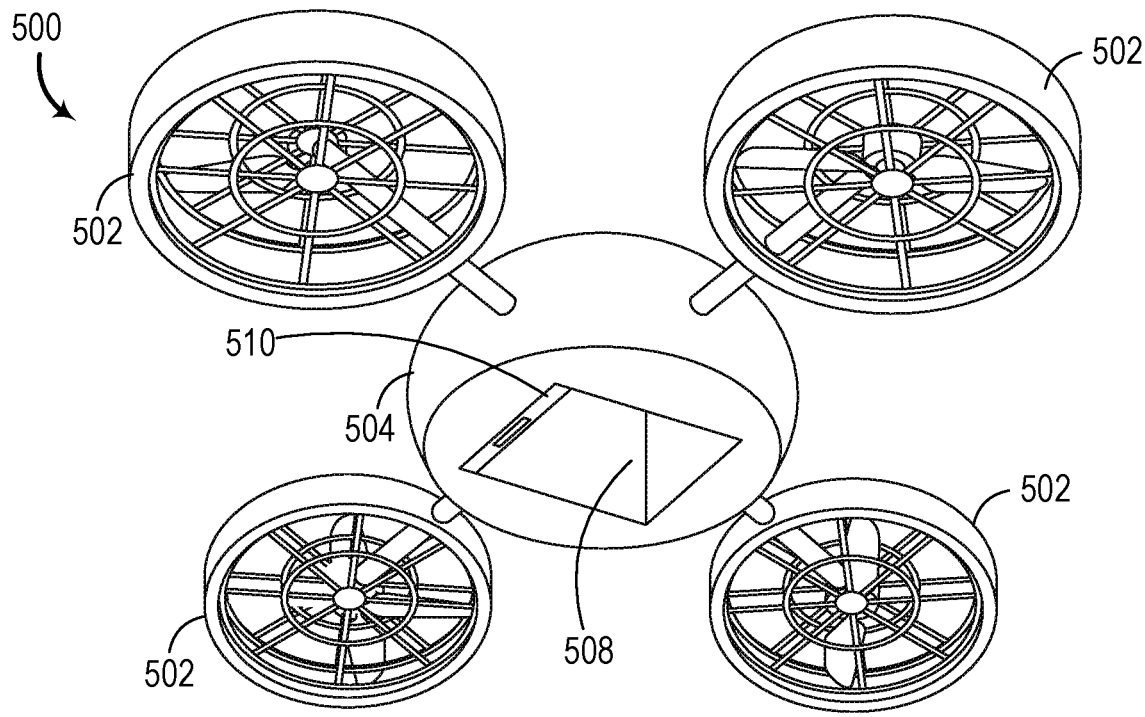

FIGS. 5C to 5D then illustrate a bottom perspective in which a bottom side of the UAV 500 is shown. As shown, the UAV 500 includes another door 510 (e.g., another sliding door) arranged on the bottom side of the fuselage 504. And an opening of the door 510 also provides access to the chamber 508 that is formed within the fuselage, thereby providing for loading of a payload onto the chamber 508 via the bottom side and/or release of a payload from the chamber 508 via the bottom side. Other illustrations are possible as well.

VII. DOOR-ENABLED PICKUP AND DELIVERY OF PAYLOADS BY A UAV

Figure 6:
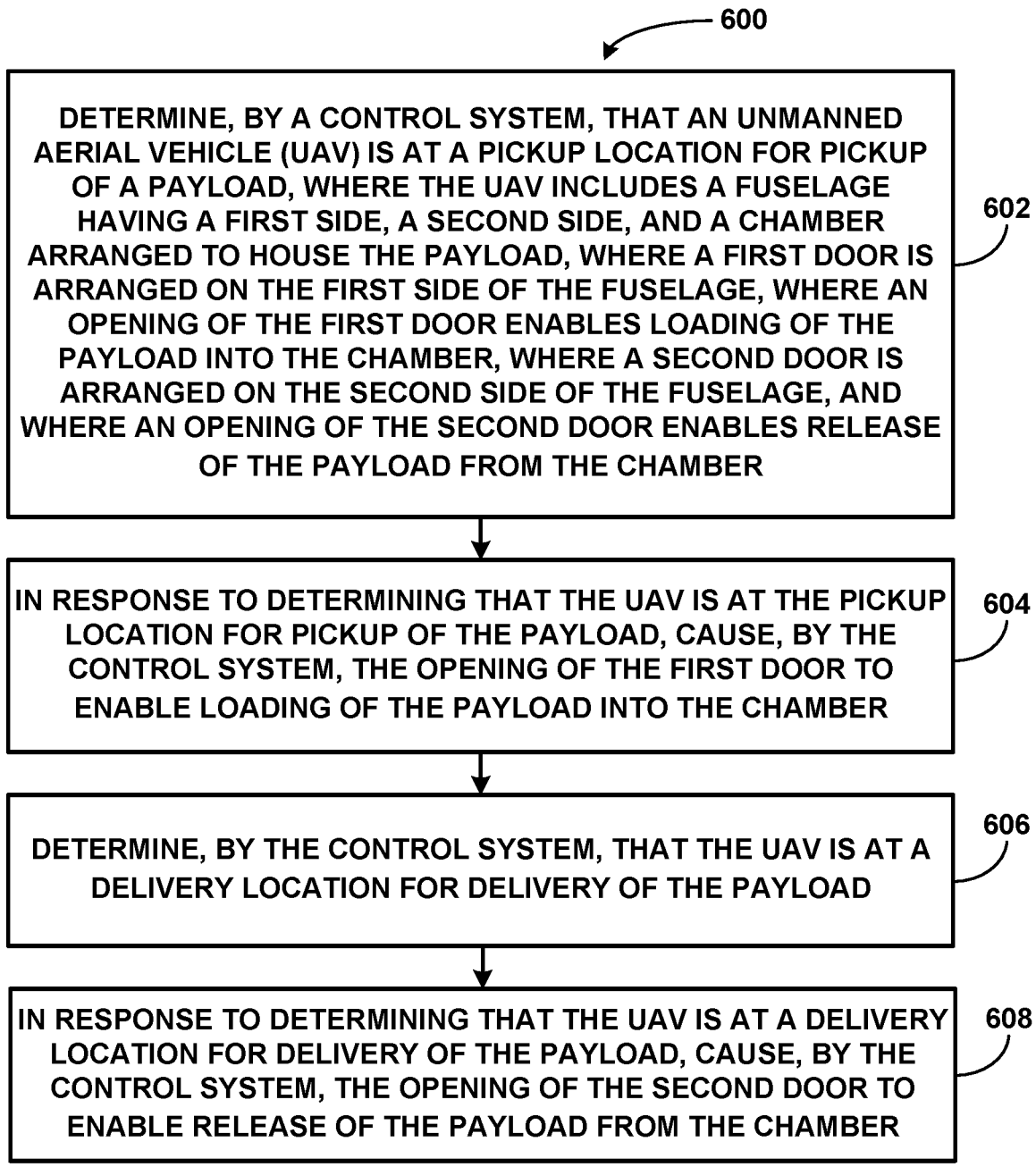
FIG. 6 is a flowchart of a method, according to example implementations.

FIG. 6 is a flowchart illustrating a method 600, which relates to use of the disclosed UAV for door-enabled pickup and delivery of a payload.

Method 600 shown in FIG. 6 (and other processes and methods disclosed herein) presents a method that can be implemented within an arrangement involving, for example, any of the systems shown in FIGS. 1A to 5D (or more particularly by one or more components or subsystems thereof, such as by a processor and a non-transitory computer-readable medium having instructions that are executable to cause the device to perform functions described herein), among other possible systems.

Method 600 and other processes and methods disclosed herein may include one or more operations, functions, or actions, as illustrated by one or more of blocks 602-608 for instance. Although blocks are illustrated in sequential order, these blocks may also be performed in parallel, and/or in a different order than those described herein. Also, the various blocks may be combined into fewer blocks, divided into additional blocks, and/or removed based upon the desired implementation.

In addition, for the method 600 and other processes and methods disclosed herein, the flowchart shows functionality and operation of one possible implementation of the present disclosure. In this regard, each block may represent a module, a segment, or a portion of program code, which includes one or more instructions executable by a processor for implementing specific logical functions or steps in the process. The program code may be stored on any type of computer readable medium, for example, such as a storage device including a disk or hard drive. The computer readable medium may include non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage device. In addition, for the method 600 and other processes and methods disclosed herein, each block in FIG. 6 may represent circuitry that is wired to perform the specific logical functions in the process.

At block 602, method 600 may involve determining, by a control system, that a UAV is at a pickup location for pickup of a payload. In line with the discussion above, this UAV may include a fuselage having a first side, a second side, and a chamber arranged to house the payload. A first door may be arranged on the first side of the fuselage, such that an opening of the first door enables loading of the payload into the chamber. And a second door may be arranged on the second side of the fuselage, such that an opening of the second door enables release of the payload from the chamber. Moreover, the control system at issue may be on-board the UAV and/or may be an external control system that transmits instructions to the UAV, among other options.

In any case, the control system may determine in various ways that the UAV is at a pickup location. For example, an aerial transport service provider may dynamically assign the UAVs to a transport task for transport of a particular item, and the transport task may have an associated a pickup location. The pickup location could be address or could be specified in other ways, such using a name of a business. In this example, the UAV may navigate to the pickup location, and the control system could determine that the UAV is at the pickup location based on data from one or more sensors. For instance, the UAV may include a GPS receiver that provides GPS coordinates of the UAV, and the control system could determine that current GPS coordinates of the UAV correspond to an address that has been specified as the pickup location. Other examples are also possible.

At block 604, method 600 may involve, in response to determining that the UAV is at the pickup location for pickup of the payload, causing, by the control system, the opening of the first door to enable loading of the payload into the chamber.

Once the control system determines that the UAV is at the pickup location, the control system may cause the opening of the first door, which may enable loading of a payload into the chamber. In practice, causing opening of the first door may involve an automatic opening of the first door, such that the first door physically moves to provide access to the chamber. Additionally or alternatively, assuming that the UAV includes a mechanism for locking and unlocking of the first door, causing opening of the first door may involve unlocking the first door, so as to allow for a manual or automatic opening of the first door.

In a more specific implementation, the control system may cause the opening of the first door in response to various trigger(s) associated with the UAV being at the pickup location. For example, the control system may cause the opening of the first door in response to determining that the UAV has landed at the pickup location. In another example, the control system may cause the opening of the first door in response to determining that the UAV is hovering at a specific spatial position in the pickup location. Other examples are also possible.

In some implementations, the control system could also cause the closing of the first door. Generally, causing closing of the first door may involve an automatic closing of the first door, such that the first door physically moves to prevent access to the chamber. Additionally, causing closing of the first door may optionally involve locking the first door, so as to prevent a manual or automatic opening of the first door after a manual or automatic closing of the first door.

In any case, the control system may cause the closing of the first door in response to one or more trigger(s) associated with the pickup location. In one example, the control system may cause the closing of the first door in response to detecting that a payload has been loaded into the chamber. In practice, the control system may detect in various ways that a payload has been loaded into the chamber. For instance, the chamber could be equipped with a touch sensor that provides touch data indicative of whether or not a payload is in the chamber. In another example, the control system may cause the closing of the first door in response to determining that the UAV has transitioned or is about to transition back to flight in the pickup location. In yet another example, the control system may cause the closing of the first door in response to determining that the UAV is no longer at the pickup location. Other examples are also possible.

At block 606, method 600 may involve determining, by the control system, that the UAV is at a delivery location for delivery of the payload.

Generally, the control system may determine in various ways that the UAV is at a delivery location. In line with the example above, an aerial transport service provider may dynamically assign the UAVs to a transport task for transport of a particular item, and the transport task may be associated with a delivery location. As with the pickup location, the delivery location could be an address or could be specified in other ways, such using a name of a business. In this example, the UAV may navigate to the delivery location after pickup of the payload at the pickup location, and the control system could determine that the UAV is at the delivery location based on data from one or more sensors. For instance, here again, the control system could determine that current GPS coordinates of the UAV correspond to an address that has been specified as the delivery location. Other examples are also possible.

At block 608, method 600 may involve, in response to determining that the UAV is at a delivery location for delivery of the payload, causing, by the control system, the opening of the second door to enable release of the payload from the chamber.

Once the control system determines that the UAV is at the delivery location, the control system may cause the opening of the second door, which may enable release of the payload from the chamber. In practice, causing opening of the second door may involve an automatic opening of the second door, such that the second door physically moves to provide a pathway for the payload to be release or otherwise unloaded from the chamber. Additionally or alternatively, assuming that the UAV includes a mechanism for locking and unlocking of the second door, causing opening of the second door may involve unlocking the second door, so as to allow for a manual or automatic opening of the second door.

In a more specific implementation, the control system may cause the opening of the second door in response to various trigger(s) associated with the UAV being at the delivery location. For example, the control system may cause the opening of the second door in response to determining that the UAV has landed at the delivery location. In another example, the control system may cause the opening of the second door in response to determining that the UAV is hovering at a specific spatial position in the delivery location. Other examples are also possible.

In some implementations, the control system could also cause the closing of the second door. Generally, causing closing of the second door may involve an automatic closing of the second door, such that the second door physically moves to prevent access to the chamber. Additionally, causing closing of the second door may involve locking the second door, so as to prevent a manual or automatic opening of the second door after a manual or automatic closing of the second door.

In any case, the control system may cause the closing of the second door in response to one or more trigger(s) associated with the delivery location. In one example, the control system may cause the closing of the second door in response to detecting that a payload has been released from the chamber. In practice, the control system may detect in various ways that a payload has been released from the chamber. For instance, in line with the example above, the chamber could be equipped with a touch sensor that provides touch data indicative of whether or not a payload is in the chamber. In another example, the control system may cause the closing of the second door in response to determining that the UAV has transitioned or is about to transition back to flight in the delivery location. In yet another example, the control system may cause the closing of the second door in response to determining that the UAV is no longer at the delivery location. Other examples are also possible.

Figure 7B:
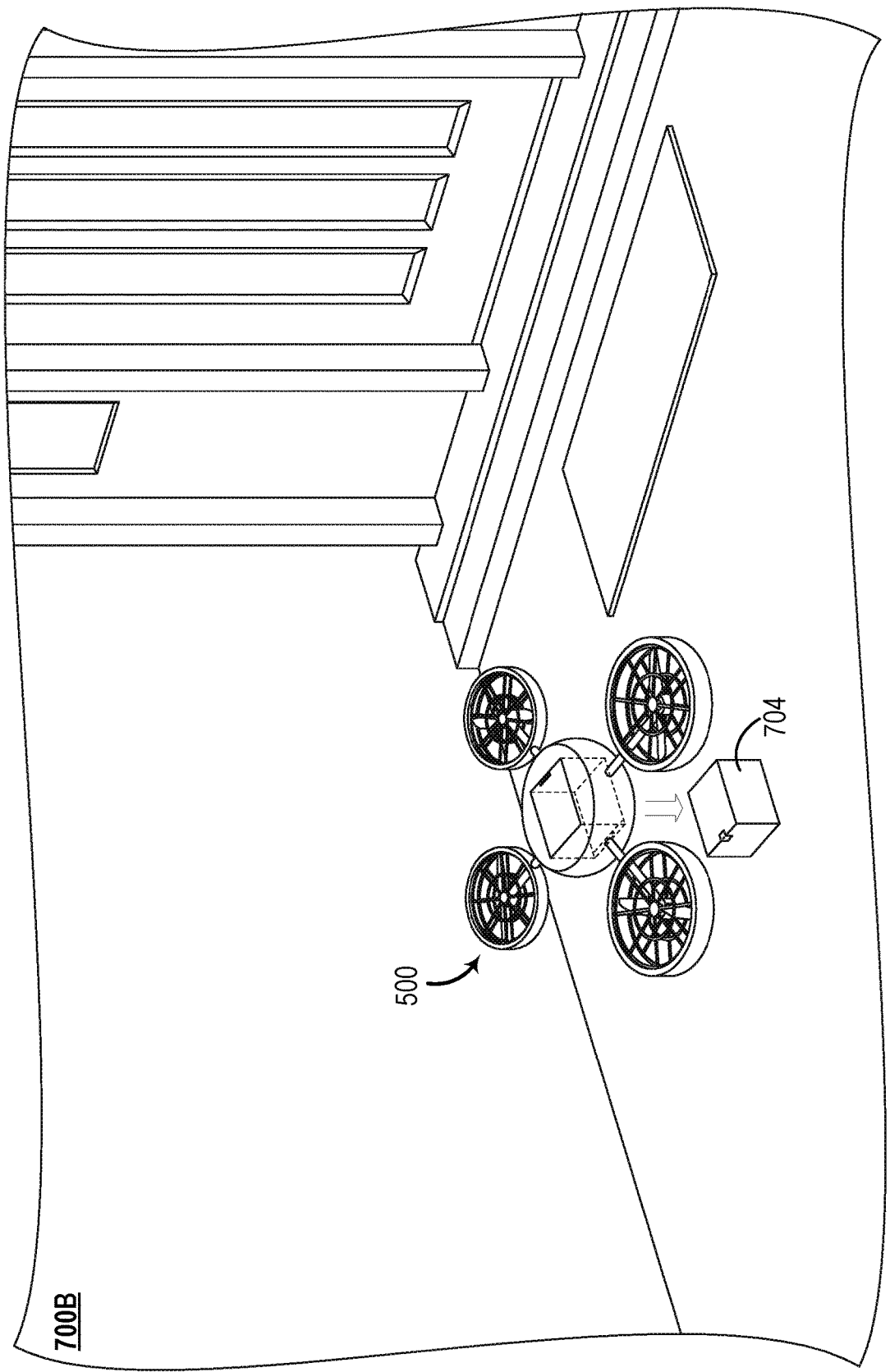
FIG. 7B illustrates door-enabled release of a payload from an unmanned aerial vehicle, according to example implementations.

FIGS. 7A to 7B next illustrate an example approach for door-enabled pickup and delivery of a payload.

FIG. 7A shows a scenario in which the UAV 500 has landed in a pickup location 700A. In response to detecting that the UAV 500 has landed in the pickup location 700A, a control system of the UAV 500 may cause the UAV 500 to open the top door 506, so as to provide access to the chamber 508 within the fuselage 504. Given this, as shown in FIG. 7A, the opening of the top door 506 has enabled loading of a package 704 into the chamber 508 (e.g., by individual 702 at the pickup location 700A). In some examples, the opening of the top door 506 also may enable retrieval of package 704 (e.g., by individual 702 or another individual at a different pickup location), as described herein.

FIG. 7B then shows a scenario in which the UAV 500 is hovering in a delivery location 700B. In response to detecting that the UAV 500 is hovering in a delivery location 700B, a control system of the UAV 500 may cause the UAV 500 to open the bottom door 510, so as to provide a pathway for release of the package 704 from the chamber 508. Given this, as shown in FIG. 7B, the opening of the bottom door 510 causes the package 704 to drop from the chamber to the ground while the UAV is hovering substantially proximate to the ground.

Figure 8A:
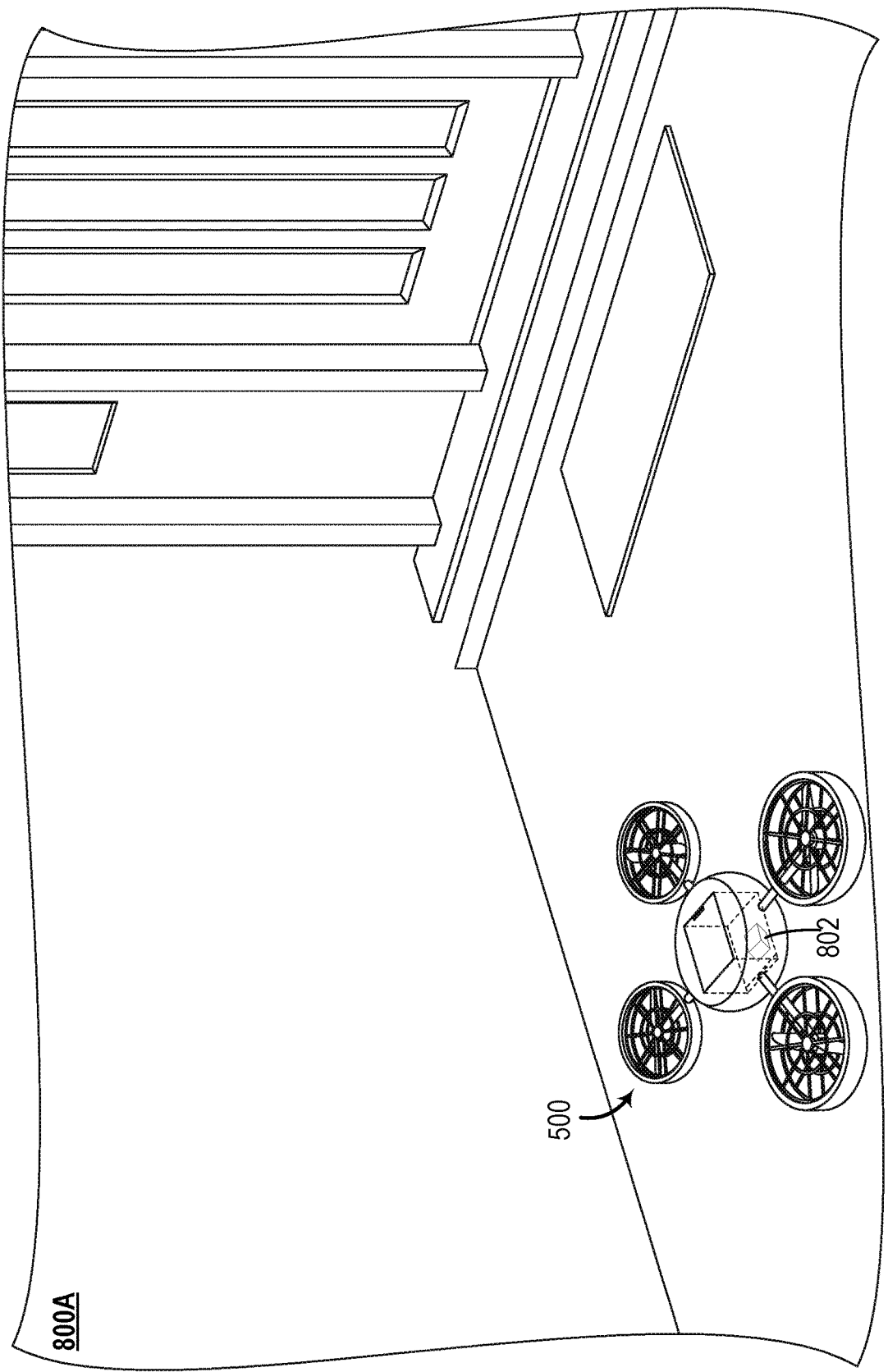
FIG. 8A illustrates another approach for door-enabled loading of a payload into an unmanned aerial vehicle, according to example implementations.
Figure 8B:
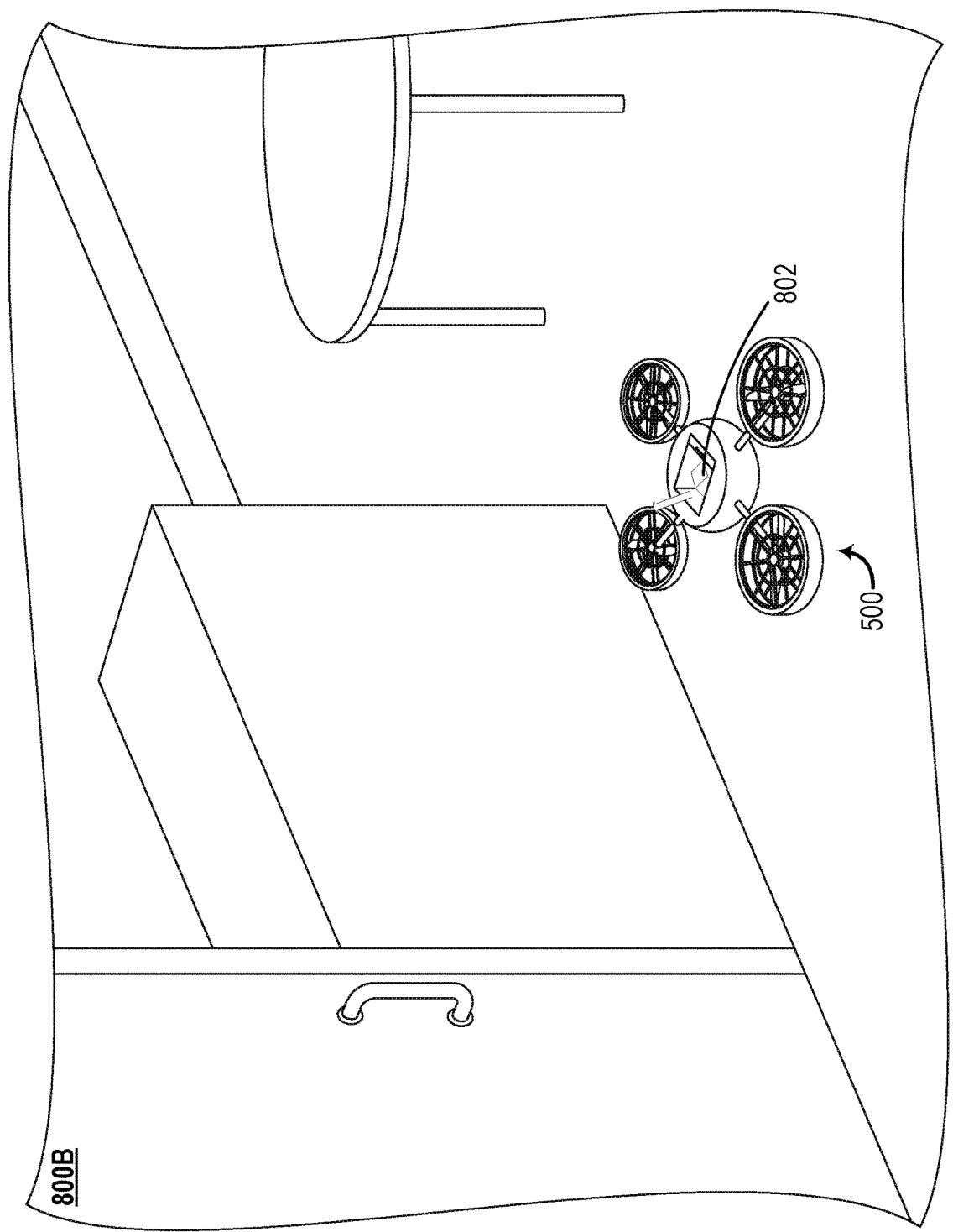
FIG. 8B illustrates another approach for door-enabled release of a payload from an unmanned aerial vehicle, according to example implementations.

FIGS. 8A to 8B next illustrate another example approach for door-enabled pickup and delivery of a payload.

FIG. 8A shows a scenario in which the UAV 500 has arrived in pickup location 800A. In response to detecting that the UAV 500 has arrived in the pickup location 800A, a control system of the UAV 500 may cause the UAV 500 to open the bottom door 510, so as to provide access to the chamber 508 within the fuselage 504. Given this, as shown in FIG. 8A, UAV 500 may land on top of an object 802 while the bottom door 510 is open, so that the object 802 on the ground ends up being located within the space provided by the chamber 508. Then, the control system of the UAV 500 may cause the UAV 500 to close the bottom door 510, such that the bottom door 510 "slides" under the object 802, thereby causing the object 802 to be disposed within the chamber 508 after closing of the bottom door 510. In this way, the UAV 500 could carry out door-enabled pick up of the object 802 without assistance of an individual.

FIG. 8B then shows a scenario in which the UAV 500 has landed in a delivery location 800B. In response to detecting that the UAV 500 has landed in the delivery location 800B, a control system of the UAV 500 may cause the UAV 500 to open the top door 506, so as to provide a pathway for release of the package 802 from the chamber 508. Given this, the opening of the top door 506 may allow an individual (not shown) to physically unload the package from the UAV 500. Other illustrations are possible as well.

VIII. USE OF DISCLOSED UAV BASED ON THE UAV MEETING CRITERIA FOR A TRANSPORT TASK

Figure 9:
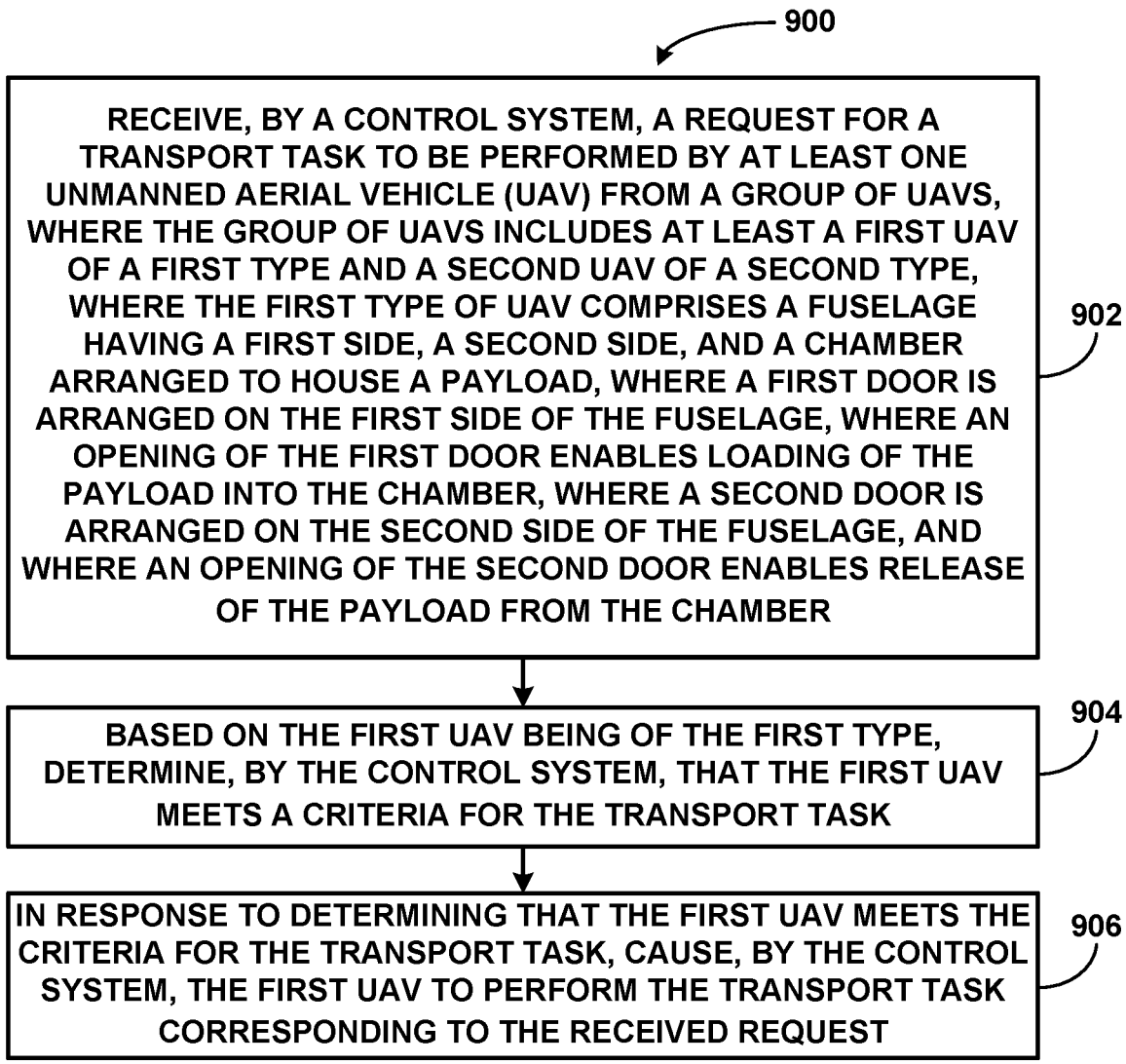
FIG. 9 is a flowchart of another method, according to example implementations.

FIG. 9 is next a flowchart illustrating a method 900, which relates to use of the disclosed UAV (i.e., that is arranged for door-enabled loading and release of a payload) when the UAV meets criteria for a transport task.

At block 902, method 900 may involve receiving, by a control system, a request for a transport task to be performed by at least one UAV from a group of UAVs.

As an initial matter, the group of UAVs may be any group that includes at least some UAVs capable of carrying out transport tasks that involve transport of payload(s). In one case, the group of UAVs may belong to an entity that provides items to be transported by one or more UAVs of the group and/or that interfaces with the recipients who request delivery of these items. In another case, the group of UAVs may belong to an aerial transport service provider, which may be a separate entity from the entity that provides the items being transported and/or that interfaces with the recipients who request delivery of these items. Other cases are also possible.

In any case, the group at issue may include at least a first UAV of a first type and a second UAV of a second type.

In accordance with the present disclosure, the first type of UAV may be the disclosed UAV that provides for door-enabled pickup and delivery of payloads. Namely, the first type of UAV may include (i) a fuselage having a first side and a second side and (ii) a chamber formed within the fuselage and arranged to house a payload. A first door may be arranged on the first side of the fuselage, such that an opening of the first door enables loading of the payload into the chamber. And a second door may be arranged on the second side of the fuselage, such that an opening of the second door enables release of the payload from the chamber.

One the other hand, the second type of UAV may be any type that is different in some way from the first type of UAV. In one example, the second type of UAV could take on a different form compared to the first type. For instance, the first type of UAV may be a quadcopter UAV (e.g., UAV 500) and the second type of UAV may be a fixed-wing UAV (e.g., fixed-wing UAV 1100a). In another example, in contrast to the arrangement of the first type of UAV, the second type of UAV could be arranged to carry out tethered pickup and delivery of payloads in line with the discussion above, and do so without use of doors that enable loading and release of payloads. In yet another example, the second type of UAV may be larger in size compared with a size of the first type of UAV. Other examples are also possible.

Given this, each type of UAV may be respectively suitable to carry out certain types of transport tasks.

In one example, given that the first type of UAV may be a lightweight UAV that could safely operate in the vicinity of individuals, the first type of UAV may be designated as a UAV that is suitable to transport one or more items having a collective weight up to a first weight (e.g., 10 lbs). Whereas, the second type of UAV may be designated as a UAV that is suitable to transport one or more items having a collective weight up to a second weight (e.g., 50 lbs) that is greater than the first weight. Of course, the second type of UAV could transport item(s) having a collective weight that is lesser than the second weight, but, in this example, item(s) having a collective weight that is lesser than the second weight would ideally be transported by the first type of UAV. As such, the second type of UAV could be used to facilitate transport of heavier items and the first type of UAV could be used to facilitate transport of lighter items.

In another example, given the size of the chamber within the fuselage, the first type of UAV may be designated as a UAV that is suitable to transport one or more items having a collective size up to a first size (e.g., lesser than the size of the chamber). Whereas, given that the second type of UAV may be arranged to carry out tethered pickup and delivery of payloads, the second type of UAV may be designated as a UAV that is suitable transport one or more items having a collective size up to a second size greater than the first size. Of course, the second type of UAV could transport item(s) having a collective size that is lesser than the second size, but, in this example, item(s) having a collective size that is lesser than the second size would ideally be transported by the first type of UAV. As such, the second type of UAV could be used to facilitate transport of larger items and the first type of UAV could be used to facilitate transport of smaller items.

In yet another example, given that the first type of UAV may include an enclosed chamber within the fuselage that is arranged to temporarily and securely house a payload, the first type of UAV may be designated as a UAV that is suitable to transport high-value item(s), such as expensive item(s), fragile item(s), or any item(s) that have been in some way designated as being of a high-value. Whereas, assuming that the second type of UAV does not include a secure chamber, the second type of UAV may be designated as a UAV that is suitable transport any item(s) other than those that have been designated as high-value item(s). Other examples are also possible.

Given a group of UAVs as described above, a control system may receive a request for a transport task to be performed by at least one UAV from the group. In practice, this control system may include control system(s) that are respectively on-board one or more of the UAVs in the group. Additionally or alternatively, the control system may be an external control system that facilitates operations of one or more UAVs from the group (e.g., ground control infrastructure of an aerial transport service provider).

Nonetheless, when the control system receives a request for a transport task, the request may include various types of information. For example, the request may specify a pickup location for pickup of an item and/or a delivery location for delivery of an item. In another example, the request may specify information about the item(s) to be transported. For instance, the request may specify a size of the item(s) and/or a weight of the item(s). And in some cases, the request could include a designation of whether or not a given item is a high-value item. Other examples are also possible.

At block 904, method 900 may involve, based on the first UAV being of the first type, determining, by the control system, that the first UAV meets a criteria for the transport task.

Once the control system receives a request for a transport task, the control system may then determine which type of UAV from the group meets criteria for the transport task. In practice, this would result in the transport task being assigned to a UAV that is most suitable to carry out that transport task.

As an initial matter, the control system could determine criteria for a transport task in various ways, such as based on information specified in the received request, for instance. For example, the control system could determine a particular size of an item to be transported, a particular weight of the item to be transported, and/or whether the item to be transported is designated as a high-value item. As such, the control system could determine based on the request that the criteria for the transport task may include: (i) ability to transport an item having the particular weight, (ii) ability to transport an item having the particular size, and/or (iii) ability to safely transport a high-value item, among others. Other examples are also possible.

Further, the control system could determine in various whether or not a given type of UAV meets criteria for a transport task. For example, the control system could have stored thereon or otherwise have access to mapping data that maps each type of UAV respectively to specific criteria met by that type of UAV. Given this, the control system could use the mapping data as basis for determining which type of UAV meets determined criteria for a transport task. Other examples are also possible.

In a more specific example, the control system may determine that a requested item to be transported is of a particular weight, and may then determine which type of UAV best meets a weight criterion for the transport task. In this example, the control system may determine, based on the first UAV being of the first type, that the first UAV is arranged to transport item(s) having a collective weight up to a first weight. Additionally, the control system may determine that the particular weight of the requested item is lesser than the first weight. Thus, based on the first UAV being of the first type, the control system may determine that the first UAV is arranged to transport the requested item that is of a particular weight lesser than the first weight.

In another specific example, the control system may determine that a requested item to be transported is of a particular size, and may then determine which type of UAV best meets a size criterion for the transport task. In this example, the control system may determine, based on the first UAV being of the first type, that the first UAV is arranged to transport item(s) having a collective size up to a first size. Additionally, the control system may determine that the particular size of the requested item is lesser than the first size. Thus, based on the first UAV being of the first type, the control system may determine that the first UAV is arranged to transport the requested item that is of a particular size lesser than the first size.

In yet another specific example, the control system may determine that a requested item to be transported is designated as a high-value item, and may then determine which type of UAV best meets an item-value criterion for the transport task. In this example, the control system may determine, based on the first UAV being of the first type, that the first UAV is arranged to transport high-value item(s). Thus, based on the first UAV being of the first type, the control system may determine that the first UAV is arranged to transport the requested item that is designated as a high-value item. Other examples are also possible.

Furthermore, when determining whether a given type of UAV meets criteria for a transport task, the control system could assess these criteria in various ways. In particular, the control system could select a given type of UAV for the transport task if that type of UAV meets each criterion for the transport task. For example, the control system could select the first type of UAV if the first type of UAV meets the weight criterion, size criterion, and item-value criterion for the transport task. Alternatively, the control system could select a given type of UAV for the transport task if that type of UAV meets at least some of the criterion for the transport task. For example, the control system could select the first type of UAV if the first type of UAV meets at least the weight criterion and size criterion. Other examples are also possible.

At block 906, method 900 may involve, in response to determining that the first UAV meets the criteria for the transport task, causing, by the control system, the first UAV to perform the transport task corresponding to the received request.

Once the control system determines that the first type of UAV meets the criteria for the transport task, the control system may responsively cause a first UAV of the first type to perform the transport task. In particular, the control system may cause the first UAV of the first type to pick up the requested item at the pickup location and to deliver the requested item at the delivery location. By way of example, referring again to FIGS. 7A to 7B, the control system may determine that UAV 500 of the first type meets a weight criterion, size criterion, and item-value criterion for a transport task associated with package 704. As a result, the control system may responsively cause the UAV 500 to pick up the package 704 at the pickup location 700A and to deliver the package 704 at the delivery location 700B. Other examples are also possible.

IX. USE OF SAME DOOR OF A UAV FOR BOTH LOADING AND RELEASE OF A PAYLOAD

Figure 10:
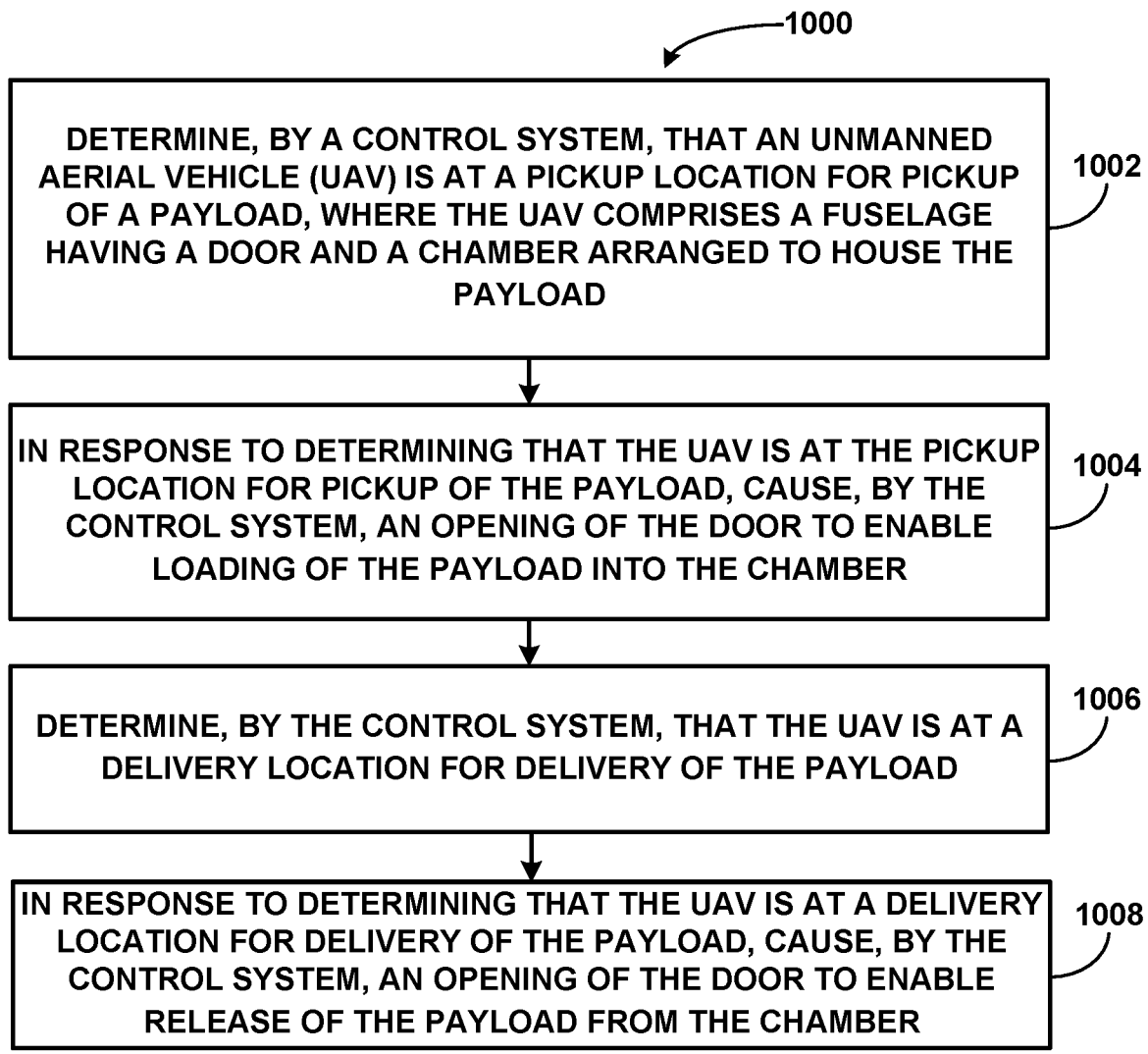
FIG. 10 is a flowchart of yet another method, according to example implementations.

FIG. 10 is next a flowchart illustrating a method 1000, which relates to use of the same door of a UAV for both loading and release of a payload, such as during pickup and delivery of the payload, respectively. The UAV at issue could be arranged to include just a single door that could be used for loading and release of a payload. Alternatively, UAV at issue could be arranged to include multiple doors and, in some situations, a single one of those doors could be used for both loading and release of a payload.

At block 1002, method 1000 may involve determining, by a control system, that an unmanned aerial vehicle (UAV) is at a pickup location for pickup of a payload, where the UAV includes a fuselage having a door and a chamber arranged to house the payload.

At block 1004, method 1000 may involve, in response to determining that the UAV is at the pickup location for pickup of the payload, causing, by the control system, an opening of the door to enable loading of the payload into the chamber.

At block 1006, method 1000 may involve determining, by the control system, that the UAV is at a delivery location for delivery of the payload.

At block 1008, method 1000 may involve, in response to determining that the UAV is at a delivery location for delivery of the payload, causing, by the control system, an opening of the door to enable release of the payload from the chamber.

X. ADDITIONAL FEATURES

A. Flip Maneuver

In a further aspect, the disclosed UAV may be configured to carry out a "flip" maneuver. In particular, assuming that the UAV has a bottom door in line with the discussion above, the flip maneuver may involve the UAV turning upside down and landing with its top side substantially oriented towards the ground and its bottom side substantially oriented away from the ground, thereby causing the bottom door to be oriented substantially away from the ground. In practice, the flip maneuver could provide yet another approach for door-enabled delivery and pickup of payloads by a UAV.

For instance, the flip maneuver may allow for use of the same door for both loading and release of a payload. In particular, if the UAV carries out the flip maneuver when the UAV is at a pickup location, this may enable loading of a payload into the chamber via the bottom door. So upon opening of the bottom door after the flip maneuver is carried out at the pickup location, a payload can be loaded into the chamber via the bottom door (e.g., by an individual). Then, once the UAV arrives at a delivery location, an opening of that same bottom door may enable release of the payload from the chamber.

Generally, in such an implementation, the disclosed UAV may or may not have another door, such as a top door, in addition to the bottom door. In one case, the UAV may still have the above-mentioned top door, so as to provide more flexibility with regards to possible approaches for door-enabled pickup and delivery of payloads as discussed above. In another case, however, the UAV may not have the top door in these implementations, and may rely solely on the bottom door to enable pickup and delivery of payloads. Thus, in this case, the ability to perform the flip maneuver could allow for a UAV design that includes just one door if so desired based on a UAV design criteria. Other implementations are also possible.

B. Authentication System

In yet a further aspect, the disclosed UAV could be further equipped with an authentication system, which could be any type of authentication system. For example, the authentication system could be a biometric authentication system configured to authenticate user(s) based on physiological characteristics, such as fingerprint or face recognition, for instance. In another example, the authentication system could be a credential-based authentication system configured to authenticate user(s) based on credentials, such as a user name password code, for instance. Other examples are also possible.

According to the present disclosure, the authentication system may be configured to authenticate user(s) for purposes of ensuring authorized payload pickup and/or delivery. Generally, such authentication may be carried out for any type of payload or may only be carried out for payloads that are designated as high-value items (e.g., medicine).

In any case, given the authentication system, the UAV may open a door only in response to authenticating a user as an authorized user. For example, the UAV may open the top door during pickup of medicine for a patient, and may do so only in response to authenticating a user that has been designated as authorized to place medicine into the chamber. In another example, the UAV may open the bottom door for release of the medicine during delivery, and may do so only in response to authenticating a user that has been designated as having a prescription for the medicine. Other examples are also possible.

XI. CONCLUSION

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method comprising:
    determining, by a control system, that an unmanned aerial vehicle (UAV) is at a pickup location for pickup of a payload, wherein the UAV comprises a fuselage having a door arranged on a first side of the fuselage, and a chamber that is accessible by the door and arranged to house the payload;
    in response to determining that the UAV is at the pickup location for pickup of the payload and with the door oriented away from the ground, causing, by the control system, an opening of the door to enable loading of the payload into the chamber;
    causing, by the control system, the UAV to carry out a flip maneuver to orient the door toward the ground;
    determining, by the control system, that the UAV is at a delivery location for delivery of the payload; and
    in response to determining that the UAV is at a delivery location for delivery of the payload, causing, by the control system, an opening of the door to enable release of the payload from the chamber by dropping the payload.

2. The method of claim 1, further comprising, in response to determine that the UAV is at the pickup location for pickup of the payload, causing, by the control system, the UAV to carry out a flip maneuver to orient the door away from the ground.

3. The method of claim 1, further comprising, in response to determining that the UAV is at the pickup location for pickup of the payload, causing, by the control system, the UAV to land with the door oriented away from the ground.

4. The method of claim 1, wherein the UAV further comprises an authentication system, the method further comprising:
    while the UAV is at the pickup location for pickup of the payload, receiving, by the control system from the authentication system, authentication data indicating that a user is an authorized user to place the payload for pickup,
    wherein causing the opening of the door to enable loading of the payload into the chamber is further in response to receiving authentication data indicating that a user is an authorized user to place the payload for pickup.

5. The method of claim 1, wherein the UAV further comprises an authentication system, the method further comprising:
    while the UAV is at the delivery location for delivery of the payload, receiving, by the control system from the authentication system, authentication data indicating that a user is an authorized user,
    wherein causing the opening of the door to enable release of the payload from the chamber is further in response to receiving authentication data indicating that a user is an authorized user.

6. The method of claim 1, wherein the UAV further comprises a second door arranged on a second side of the fuselage.

7. The method of claim 1, wherein the door arranged on the first side of the fuselage is the only door on the fuselage.

8. A method comprising:
    determining, by a control system, that an unmanned aerial vehicle (UAV) is at a pickup location for pickup of a payload, wherein the UAV comprises a fuselage having a door arranged on a first side of the fuselage, and a chamber that is accessible by the door and arranged to house the payload;
    in response to determining that the UAV is at the pickup location for pickup of the payload, causing, by the control system, the UAV to carry out a flip maneuver to orient the door away from the ground;
    while the UAV is at the pickup location and with the door oriented away from the ground, causing, by the control system, an opening of the door to enable loading of the payload into the chamber.

9. The method of claim 8, further comprising:
    determining, by the control system, that the UAV is at a delivery location for delivery of the payload; and
    in response to determining that the UAV is at the delivery location for delivery of the payload, causing, by the control system, an opening of the door to enable release of the payload from the chamber by dropping the payload.

10. The method of claim 8, further comprising, in response to determining that the UAV is at the pickup location for pickup of the payload, causing, by the control system, the UAV to land after carrying out the flip maneuver with the door oriented away from the ground.

11. The method of claim 8, wherein the UAV further comprises an authentication system, the method further comprising:
    while the UAV is at the pickup location for pickup of the payload, receiving, by the control system from the authentication system, authentication data indicating that a user is an authorized user to place the payload for pickup,
    wherein causing the opening of the door to enable loading of the payload into the chamber is further in response to receiving authentication data indicating that a user is an authorized user to place the payload for pickup.

12. The method of claim 8, wherein the UAV further comprises an authentication system, the method further comprising:
    while the UAV is at the delivery location for delivery of the payload, receiving, by the control system from the authentication system, authentication data indicating that a user is an authorized user,
    wherein causing the opening of the door to enable release of the payload from the chamber is further in response to receiving authentication data indicating that a user is an authorized user.

13. An unmanned aerial vehicle (UAV) comprising:
    a fuselage having a first side, a second side, a door arranged on the first side of the fuselage, and a chamber that is accessible by the door arranged to house a payload; and a control system configured to:
    determine that the UAV is at a pickup location for pickup of a payload;
    in response to determining that the UAV is at the pickup location for pickup of the payload and with the door oriented away from the ground, cause an opening of the door to enable loading of the payload into the chamber;
    cause the UAV to carry out a flip maneuver to orient the door toward the ground;
    determine that the UAV is at a delivery location for delivery of the payload; and
    in response to determine that the UAV is at a delivery location for delivery of the payload, cause an opening of the door to enable release of the payload from the chamber by dropping the payload.

14. The UAV of claim 13, further comprising a second door arranged on a second side of the fuselage.

15. The UAV of claim 13, wherein the door arranged on the first side of the fuselage is the only door on the fuselage.

16. The UAV of claim 13, wherein the first side of the fuselage is a bottom side that is substantially oriented towards the ground during flight of the UAV.

17. The UAV of claim 13, wherein the control system is further configured to, in response to determine that the UAV is at the pickup location for pickup of the payload, cause the UAV to carry out a flip maneuver to orient the door away from the ground.

18. The UAV of claim 13, wherein the control system is further configured to, in response to determining that the UAV is at the pickup location for pickup of the payload, cause the UAV to land with the door oriented away from the ground.

19. The UAV of claim 13, further comprising an authentication system, wherein the control system is further configured to:
    while the UAV is at the pickup location for pickup of the payload, receive, from the authentication system, authentication data indicating that a user is an authorized user to place the payload for pickup,
    wherein causing the opening of the door to enable loading of the payload into the chamber is further in response to receiving authentication data indicating that a user is an authorized user to place the payload for pickup.

20. The UAV of claim 13, further comprising an authentication system, the method further comprising:
    while the UAV is at the delivery location for delivery of the payload, receive, from the authentication system, authentication data indicating that a user is an authorized user,
    wherein causing the opening of the door to enable release of the payload from the chamber is further in response to receiving authentication data indicating that a user is an authorized user.

* * * * *